United States Patent
Takahashi et al.

(10) Patent No.: US 8,311,165 B2
(45) Date of Patent: Nov. 13, 2012

(54) INTERFERENCE SUPPRESSION METHOD AND INTERFERENCE SUPPRESSION DEVICE

(75) Inventors: Hiroshi Takahashi, Osaka (JP); Chalermphol Apichaichalermwongse, Bangkok (TH); Kenji Miyanaga, Osaka (JP); Yoshio Urabe, Nara (JP); Kazuhiro Ando, Osaka (JP); Hiroshi Hayashino, Hyogo (JP)

(73) Assignee: Panasonic Corporation, Osaka (JP)

( * ) Notice: Subject to any disclaimer, the term of this patent is extended or adjusted under 35 U.S.C. 154(b) by 697 days.

(21) Appl. No.: 12/299,933

(22) PCT Filed: May 9, 2007

(86) PCT No.: PCT/JP2007/059607
§ 371 (c)(1),
(2), (4) Date: Feb. 3, 2009

(87) PCT Pub. No.: WO2007/129737
PCT Pub. Date: Nov. 15, 2007

(65) Prior Publication Data
US 2009/0147893 A1    Jun. 11, 2009

(30) Foreign Application Priority Data
May 9, 2006 (JP) .................................. 2006-129993

(51) Int. Cl.
*H04B 1/00* (2006.01)
*H04B 7/10* (2006.01)
*H04K 1/10* (2006.01)
*H04L 1/02* (2006.01)

(52) U.S. Cl. ........ 375/346; 375/148; 375/260; 375/316; 375/347; 375/348

(58) Field of Classification Search .................. 375/285, 375/284, 140, 296, 348, 278; 370/445, 432, 370/338, 339; 455/143
See application file for complete search history.

(56) References Cited

U.S. PATENT DOCUMENTS
6,937,676 B2 *    8/2005    Takada et al. ................. 375/346
(Continued)

FOREIGN PATENT DOCUMENTS
JP    2002-217913    8/2002
JP    2002-374179    12/2002
JP    2003-174431    6/2003
(Continued)

OTHER PUBLICATIONS
International Search Report issued Jun. 5, 2007 in the International (PCT) Application of which the present application is the U.S. National Stage.

*Primary Examiner* — David Ometz
*Assistant Examiner* — Ross Varndell
(74) *Attorney, Agent, or Firm* — Wenderoth, Lind & Ponack, L.L.P.

(57) ABSTRACT

A reception station $1b$ compares its BSSID with BSSID included in a signal that has arrived thereat. As BSSIDs included in signals transmitted by interfering stations $1c$ and $1d$ both match BSSID of the reception station $1b$, the reception station $1b$ identifies each of the interfering stations $1c$ and $1d$ as a non-suppression target transmission source. As neither of BSSIDs included in signals transmitted by interfering stations $2a$ and $2b$ matches BSSID of the reception station $1b$, the reception station $1b$ identifies each of the interfering stations $2a$ and $2b$ as a suppression target transmission source. The reception station $1b$ uses characteristic amounts of signals that are associated with the interfering stations (i.e., suppression target transmission sources) $2a$ and $2b$ and that have been measured in the past as characteristic amounts of interfering signals that are used to suppress the interfering signals from a received signal.

7 Claims, 21 Drawing Sheets

U.S. PATENT DOCUMENTS

| | | |
|---|---|---|
| 7,046,690 B2 * | 5/2006 | Sherman .................. 370/445 |
| 2002/0051430 A1 | 5/2002 | Kasami et al. |
| 2002/0196876 A1 | 12/2002 | Takada |
| 2007/0259623 A1 | 11/2007 | Tanaka et al. |

FOREIGN PATENT DOCUMENTS

| | | |
|---|---|---|
| JP | 2004-357056 | 12/2004 |
| JP | 2005-312073 | 11/2005 |
| WO | 2006/003776 | 1/2006 |

* cited by examiner

FIG. 4

| No. | CHARACTERISTIC AMOUNT | | | | |
|---|---|---|---|---|---|
| | SUBBAND 1 | SUBBAND 2 | SUBBAND 3 | SUBBAND 4 | SUBBAND 5 |
| 1 | W11 | W12 | W13 | W14 | W15 |
| 2 | W21 | W22 | W23 | W24 | W25 |
| 3 | W31 | W32 | W33 | W34 | W35 |

FIG. 13

| SURROUNDING TERMINAL ADDRESS | SURROUNDING TERMINAL LIST | NON-SUPPRESSION TARGET TERMINAL LIST | SUPPRESSION TARGET TERMINAL LIST |
|---|---|---|---|
| R (OWN STATION) | S, A, B, C | - | - |
| S | R, C | C | A, B |
| A | R, S, B, C | S, B, C | - |
| B | R, A, C | A, C | S |
| C | R | - | S, A, B |

FIG. 14

| SURROUNDING TERMINAL ADDRESS | CHARACTERISTIC AMOUNT | | | | |
|---|---|---|---|---|---|
| | SUBBAND 1 | SUBBAND 2 | SUBBAND 3 | SUBBAND 4 | SUBBAND 5 |
| S | WS1 | WS2 | WS3 | WS4 | WS5 |
| A | WA1 | WA2 | WA3 | WA4 | WA5 |
| B | WB1 | WB2 | WB3 | WB4 | WB5 |
| C | WC1 | WC2 | WC3 | WC4 | WC5 |

FIG. 21

| RECOGNIZABLE TERMINAL ADDRESS | RECOGNIZABLE TERMINAL LIST | SURROUNDING TERMINAL LIST | HIDDEN TERMINAL LIST | NON-SUPPRESSION TARGET TERMINAL LIST | SUPPRESSION TARGET TERMINAL LIST |
|---|---|---|---|---|---|
| R (OWN STATION) | S, A, B, C | S, A, B, C | - | - | - |
| S | R, C, A, B | R, C | A, B | C | A, B |
| A | R, S, B, C | R, S, B, C | - | S, B, C | - |
| B | R, S, A, C | R, A, C | S | A, C | S |
| C | R, S, A, B | R | S, A, B | - | S, A, B |

INTERFERENCE SUPPRESSION METHOD AND INTERFERENCE SUPPRESSION DEVICE

TECHNICAL FIELD

The present invention relates to technology for suppressing an interfering signal superimposed on a desired signal based on a characteristic amount of the interfering signal.

BACKGROUND ART

In a radio communication system, such as a wireless Local Area Network (LAN) system and a digital cellular communication system, a plurality of radio stations share a predetermined frequency band in performing communication. Consequently, in such a system, a radio station on the receiving end (i.e., reception station) not only receives a desired signal, which is a signal addressed and transmitted to the reception station by a radio station with which the reception station is performing communication (i.e., transmission station), but also receives an interfering signal, which is a signal transmitted by a radio station that is unrelated to the communication performed by the reception station (i.e., interfering station).

When a transmission period over which the transmission station transmits the desired signal overlaps a transmission period over which the interfering station transmits the interfering signal, the reception station receives the desired signal with the interfering signal superimposed thereon in the overlapped period.

Assume the above case where the reception station receives the desired signal with the interfering signal superimposed thereon. Here, for example, if a received power of the interfering signal is larger than a received power of the desired signal on the reception station side, or if the desired signal and the interfering signal were transmitted using the same channel frequency, then the interfering signal renders errors more likely to occur in demodulating the desired signal.

In light of the above, there have been provided interference suppression technologies for, when an interfering signal is superimposed on a desired signal, suppressing the superimposed interfering signal in accordance with a characteristic amount of the interfering signal, so as to prevent errors in demodulating the desired signal.

One of the conventional interference suppression technologies regards a desired signal as a wideband signal and an interfering signal as a narrowband signal that is transmitted periodically (for example, see Patent Document 1).

The above interference suppression technology judges that a received signal is an interfering signal if a received power of the received signal changes in constant cycles, and estimates a characteristic amount of the interfering signal. This way, when a signal that includes a desired signal is received, the above interference suppression technology suppresses the interfering signal that has been superimposed on the desired signal included in the received signal, by using the assumed characteristic amount of the interfering signal.

Patent Document 1:
  Japanese Laid-Open Patent Application No. 2002-374179

SUMMARY OF THE INVENTION

The Problems the Invention is Going to Solve

The above interference suppression technology can be employed when a time division multiple access (TDMA) method is used as an access method whereby an interfering signal having a fixed packet length arrives at a reception station periodically.

However, when a carrier sense multiple access with collision avoidance (CSMA/CA) method is used as the access method, a radio packet signal having a variable packet length is transmitted by a transmission station in a random manner, and accordingly arrives at the reception station in a random manner. For this reason, the above interference suppression technology, which suppresses a periodically-transmitted interfering signal, cannot be employed in a radio communication system using the CSMA/CA method.

Furthermore, the structure of the reception station (e.g., a number of antennas mounted on the reception station) generally limits a number of interfering signals that the reception station can remove from the received signal. Accordingly, in a case where the reception station has estimated characteristic amounts of interfering signals that were transmitted by interfering stations before, the reception station should remove an interfering signal from a received signal by using part of these estimated characteristic amounts of the interfering signals that were transmitted by the interfering stations before.

Here, if the above-described part of the characteristic amounts, which is used to remove an interfering signal from a received signal, is arbitrarily selected from the estimated characteristic amounts of the interfering signals that were transmitted by the interfering stations before, then there is a high probability that the above-described part of the characteristic amounts is of an interfering signal that is other than the interfering signal that has been actually superimposed on the desired signal. In this case, the reception station cannot suppress the interfering signal from the currently received signal.

In view of the above, an object of the present invention is to provide an interference suppression method and an interference suppression device that can effectively suppress an interfering signal from a received signal, by increasing the probability that a characteristic amount of an interfering signal that a reception station uses to remove the interfering signal from the received signal is a characteristic amount of an interfering signal that has actually been super imposed on a desired signal, even in a case where the reception station receives the interfering signal in a random manner.

Means to Solve the Problems

In order to achieve the above object, the present invention provides an interference suppression method used in a reception station to suppress an interfering signal that has been superimposed on a desired signal, the desired signal being transmitted by a partner station with which the reception station is performing communication, the interference suppression method comprising the steps of: identifying a transmission source, from which the reception station received a signal, as either (i) a suppression target transmission source that has a possibility of transmitting an interfering signal superimposed on the desired signal, or (ii) a non-suppression target transmission source that does not have the possibility of transmitting the interfering signal; acquiring, from the received signal, a characteristic amount thereof; and when the reception station receives the desired signal, suppressing the interfering signal superimposed on the desired signal with use of the characteristic amount of the received signal that was transmitted by the suppression target transmission source.

The present invention also provides an interference suppression device provided in a reception station to suppress an interfering signal that has been superimposed on a desired signal, the desired signal being transmitted by a partner station with which the reception station is performing communication, the interference suppression device comprising: an identifying unit operable to identify a transmission source, from which the reception station received a signal, as either (i) a suppression target transmission source that has a possibility of transmitting an interfering signal superimposed on the desired signal, or (ii) a non-suppression target transmission source that does not have the possibility of transmitting the interfering signal; an acquiring unit operable to acquire, from the received signal, a characteristic amount thereof; and a suppressing unit operable to, when the reception station receives the desired signal, suppress the interfering signal superimposed on the desired signal with use of the characteristic amount of the received signal that was transmitted by the suppression target transmission source.

EFFECTS OF THE INVENTION

According to the above interference suppression method and the interference suppression device, the reception station identifies the transmission source, from which the reception station received the signal, as either the suppression target transmission source or the non-suppression target transmission source. The reception station uses the characteristic amount that has been acquired from the received signal which was transmitted by the suppression target transmission source as a characteristic amount of a signal which is used to suppress the interfering signal from the currently received signal. Accordingly, in suppressing the interfering signal from the received signal, the reception station can be prevented from using the characteristic amount of the signal which was transmitted from the transmission source that has been identified as the non-suppression target transmission source. This increases a possibility that a characteristic amount of a received signal which is used to suppress an interfering signal from the received signal is the characteristic amount of the interfering signal that has been actually superimposed on the desired signal, and thereby makes it possible to effectively suppress the interfering signal from the received signal.

The above interference suppression method may further comprise the step of comparing (i) a first network identifier indicating a first network to which the transmission source belongs, the first network identifier being included in the received signal, with (ii) a second network identifier indicating a second network to which the reception station belongs, wherein the identifying step identifies the transmission source as (i) the non-suppression target transmission source when a result of the comparing step shows that the first network identifier matches the second network identifier, and (ii) the suppression target transmission source when the result of the comparing step shows that the first network identifier is different from the second network identifier.

In the above interference suppression method, each of the first network identifier and the second network identifier may be a basic service set identifier (BSSID).

For example, in a radio communication system conforming to the Institute of Electronic and Electronics Engineers (IEEE) 802.11a standard, when the radio communication system employs a CSMA/CA method as an access method, a transmission period of the transmission station and a transmission period of a radio station belonging to the same basic service set (BSS) as the transmission station do not generally overlap. On the other hand, it is normally possible that the transmission period of the transmission station overlaps with a transmission period of a radio station belonging to a different BSS from the one to which the transmission station belongs. In light of this, the above-described interference suppression method allows accurately identifying a transmission source of a signal that the reception station has received.

The above interference suppression method may further comprise the step of judging whether or not a time when the reception station received the signal is within a transmission prohibition period that has been set in a network to which the reception station belongs, wherein when the judging step judges that the time is within the transmission prohibition period, the identifying step identifies the transmission source as the suppression target transmission source.

In the above interference suppression method, the transmission prohibition period may be set in accordance with an inter-frame space (IFS).

For example, in the radio communication system conforming to the IEEE 802.11a standard, a radio station belonging to the same network as the transmission station does not generally perform transmission during a transmission prohibition period that has been set based on IFS and the like of the network to which the transmission station belongs. As opposed to this, it is normally possible that a radio station belonging to a different network from the one to which the transmission station belongs performs transmission during the transmission prohibition period, and that electronic devices, such as a microwave, emit electric waves during the transmission prohibition period. In light of this, the above interference suppression methods allow accurately identifying a transmission source of a signal that the reception station has received.

The above interference suppression method may further comprise the step of judging whether or not a time when the reception station received the signal is within an interference measurement prohibition period throughout which there is a possibility that the reception station receives the desired signal, wherein when the judging step judges that the time is within the interference measurement prohibition period, the identifying step identifies the transmission source as the non-suppression target transmission source.

For example, in an HCF controlled channel access (HCCA), the reception station grants the transmission station a right to perform transmission for a predetermined time period by transmitting a QoS CF-Poll frame to the transmission station. In this case, by setting the interference measurement prohibition period based on the stated predetermined time period, the reception station can avoid using, by mistake, a characteristic amount of a desired signal as a characteristic amount of a signal which is used to suppress the interfering signal superimposed on the desired signal.

The above interference suppression method may further comprise the step of detecting, from the received signal, a preamble signal that includes a plurality of symbols having signal waveforms of a predetermined pattern, wherein when the detecting step cannot detect the preamble signal, the identifying step identifies the transmission source as the suppression target transmission source.

For example, the reception station can detect a preamble signal from neither of the following: a radio packet signal transmitted by a radio station that belongs to a network whose specification is different from the specification of the network to which the reception station belongs; and electric waves emitted by electronic devices, such as a microwave. Here, the transmission of the radio packet signal by the radio station that belongs to the network whose specification is different from the specification of the network to which the reception station belongs, as well as the emission of the electric waves by the electronic devices, such as the microwave, is performed independently of the transmission performed by the transmission station. Therefore, the above-described interference suppression method allows accurately identifying a transmission source of a signal that the reception station has received.

The above interference suppression method may further comprise the steps of: generating a first surrounding terminal list showing a plurality of transmission source identifiers that indicate, in one-to-one correspondence, a plurality of transmission sources from which the reception station has received signals in the past; and obtaining, from the partner station, a second surrounding terminal list showing a plurality of transmission source identifiers that indicate, in one-to-one correspondence, a plurality of transmission sources from which the partner station has received signals in the past, wherein the identifying step identifies the transmission source of the received signal as either the suppression target transmission source or the non-suppression target transmission source in accordance with the first surrounding terminal list and the second surrounding terminal list.

In the above interference suppression method, the identifying step may identify the transmission source of the received signal as the non-suppression target transmission source when a transmission source identifier of the received signal is shown in both of the first surrounding terminal list and the second surrounding terminal list.

Or, the identifying step may identify the transmission source as the suppression target transmission source when a transmission source identifier of the received signal is shown in the first surrounding terminal list but is not shown in the second surrounding terminal list.

For example, in a radio communication system that employs the CSMA/CA method as the access method, when each radio station has a radio arrival area of the same dimension (i.e., every radio station can transmit a signal by the same distance), a transmission period of a transmission source whose radio arrival area encloses the transmission station never overlaps with a transmission period of the transmission station. On the other hand, there is a possibility that a transmission period of a transmission source whose radio arrival area does not enclose the transmission station overlaps with the transmission period of the transmission station. In view of this, a transmission source that satisfies the following conditions does not have a possibility of transmitting an interfering signal superimposed on a desired signal that is transmitted to the reception station by the transmission station: (i) is one of transmission sources of signals that have arrived at the reception station; and (ii) is one of transmission sources of signals that have arrived at the transmission station. In contrast, a transmission source that satisfies the following conditions does have a possibility of transmitting an interfering signal superimposed on a desired signal that is transmitted to the reception station by the transmission station: (i) is one of transmission sources of signals that have arrived at the reception station; and (ii) is not one of transmission sources of signals that have arrived at the transmission station. In light of this, the above-described interference suppression method allows accurately identifying a transmission source of a signal that the reception station has received.

In the above interference suppression method, the obtaining step may obtain the second surrounding terminal list by receiving a signal that includes content of the second surrounding terminal list from the partner station, then reading out the content of the second surrounding terminal list from the signal received from the partner station.

In the above interference suppression method, the obtaining step may include the sub-steps of: transmitting, to the partner station, a request signal that requests the partner station to transmit the second surrounding terminal list to the reception station; receiving a response signal that includes content of the second surrounding terminal list, the response signal being transmitted by the partner station in response to the request signal transmitted in the transmitting step; and reading out the content of the second surrounding terminal list from the received response signal.

In the above interference suppression method, the transmitting step may perform the transmission of the request signal by transmitting, to the partner station, two Clear to Send (CTS) frames in succession.

Each of the above structures can provide the reception station with a simple mechanism to acquire the second surrounding terminal list from the transmission station.

BRIEF DESCRIPTION OF THE DRAWINGS

FIG. 4 shows an example of content stored in a characteristic amount storage unit.

FIG. 13 shows an example of content stored in a terminal list storage unit shown in FIG. 12.

FIG. 14 shows an example of content stored in a characteristic amount storage unit shown in FIG. 12.

FIG. 21 shows another example of the content stored in the terminal list storage unit shown in FIG. 12.

Figure 1:
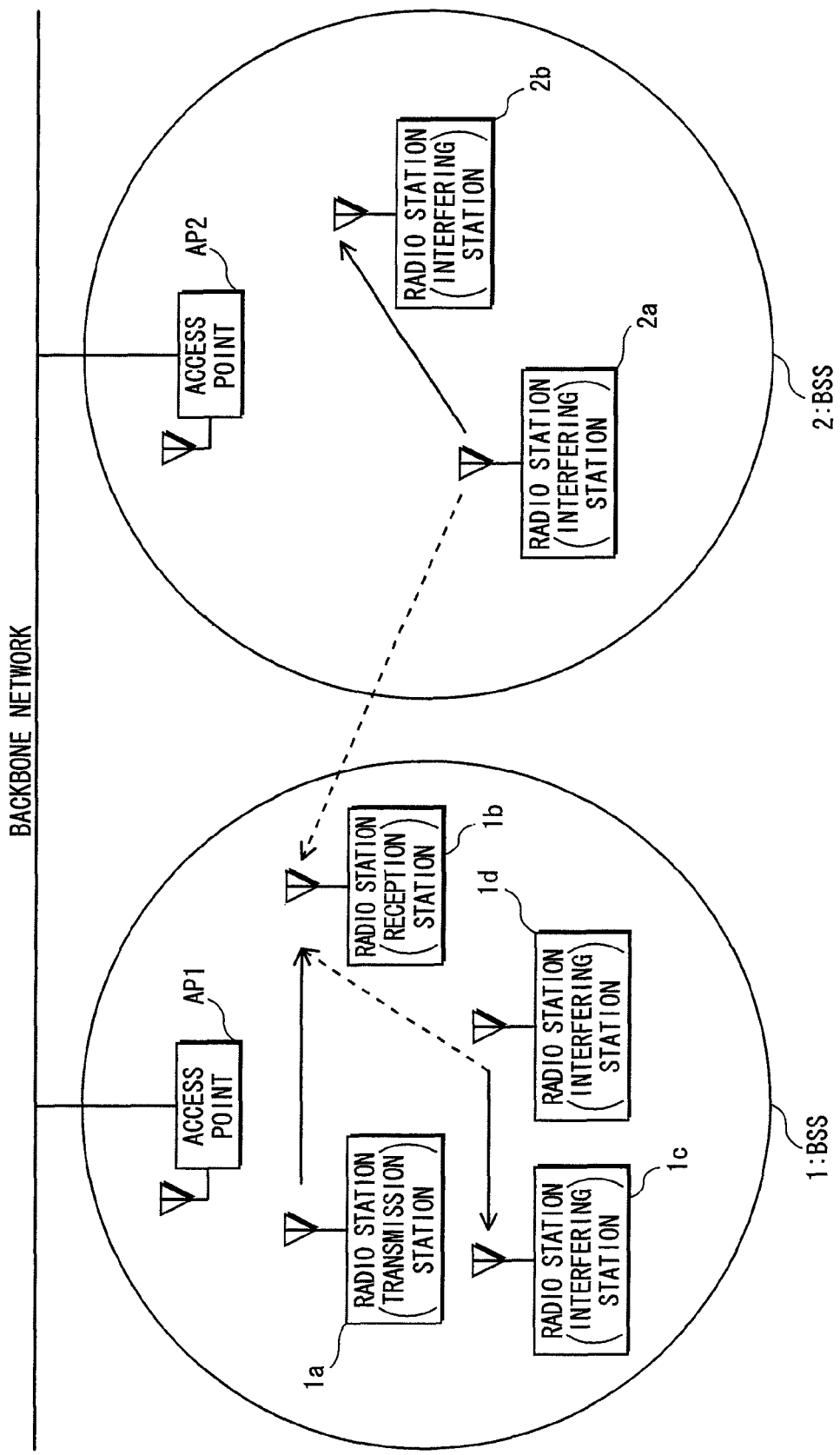
FIG. 1 is a system structural diagram showing a radio communication system of Embodiment 1.

DESCRIPTION OF CHARACTERS 1a, 1b, 1c, 1d, 2a, 2b radio station
11-1, 11-k antenna
12 switch circuit
13-1, 13-k RF unit
14 signal detection unit
15 suppression target identification unit
16 characteristic amount storage unit
17 interference suppression unit
18 MAC unit
19 modulation unit
20 RF unit

DETAILED DESCRIPTION OF THE INVENTION

<<Embodiment 1>>

Below is a description of Embodiment 1 of the present invention, with reference to the accompanying drawings.
<System Structure>

With reference to FIG. 1, the following describes a radio communication system of Embodiment 1. FIG. 1 is a system structural diagram showing the radio communication system of Embodiment 1.

It should be mentioned here that Embodiment 1 employs a radio communication system using a CSMA/CA method as an access method.

Two basic service sets (BSS), BSS1 and BSS 2, are illustrated in FIG. 1.

BSS1 includes an access point AP1 and a plurality of radio stations 1a, 1b, 1c and 1d. A basic service set identifier (BSSID) is included in a media access control (MAC) header of a radio packet signal transmitted by the radio station 1a, the radio station 1b, etc. In BSS1, BSSID is a MAC address of the access point AP1.

BSS2 includes an access point AP2 and a plurality of radio stations 2a and 2b. BSSID is included in a MAC header of a radio packet signal transmitted by the radio station 2a, the radio station 2b, etc. In BSS2, BSSID is a MAC address of the access point AP2.

The access point AP1 of BSS1 and the access point AP2 of BSS2 are both connected to a backbone network.

The following description will be given under the assumption that the radio station 1a is a transmission station, the radio station 1b is a reception station, and the rest of the radio stations 1c, 1d, 2a and 2b are all interfering stations.

As will be described later in detail, the reception station 1b identifies a transmission source of a signal it has received as either (i) a suppression target transmission source, which is an interfering source that has a possibility of transmitting an interfering signal to be superimposed on a desired signal transmitted by the transmission station 1a, or (ii) a non-suppression target transmission source, which is an interfering source that does not have such a possibility. Here, the reception station 1b basically makes such identification based on (i) whether or not the timing at which it receives the signal is within an after-mentioned transmission prohibition period, (ii) whether or not a preamble signal has been detected from the received signal, and (iii) whether or not its own BSSID matches BSSID included in a MAC header of the received signal.

For example, since the interfering stations 1c and 1d belong to the same BSS1 as the reception station 1b, the reception station 1b judges that its own BSSID is the same as BSSID included in a MAC header of a signal transmitted by each of the interfering stations 1c and 1d. Accordingly, the reception station 1b identifies the interfering stations 1c and 1d as the non-suppression target transmission sources.

In contrast, since the interfering stations 2a and 2b belong to BSS2 that is different from BSS1 to which the reception station 1b belongs, the reception station 1b judges that its own BSSID matches neither one of BSSIDs included in MAC headers of signals transmitted by the interfering stations 2a and 2b. Accordingly, the reception station 1b identifies the interfering stations 2a and 2b as the suppression target transmission sources.

To suppress an interfering signal that has been superimposed on a desired signal, the reception station 1b selects one transmission source from all of the suppression target transmission sources, and then suppresses the interfering signal superimposed on the desired signal by using a characteristic amount of an interfering signal that has been transmitted by the selected transmission source.

As such, a characteristic amount of an interfering signal that is used to suppress an interfering signal superimposed on a desired signal is selected only from the suppression target transmission sources, and not from the non-suppression target transmission sources.

The above structure thereby increases the probability that a characteristic amount of a signal that is used to suppress an interfering signal superimposed on a desired signal is a characteristic amount of an interfering signal that has been actually superimposed on a desired signal. This makes it possible to effectively suppress an interfering signal that has been superimposed on a desired signal.

Note, Embodiment 1 is described under the assumption that there is a problem of co-channel frequency, i.e., a channel frequency of radio communication between the transmission station 1a and the reception station 1b is the same as those between the interfering stations 1c and 1d and between the interfering stations 2a and 2b.

<Frame Format of Radio Packet Signal>

Figure 2A:
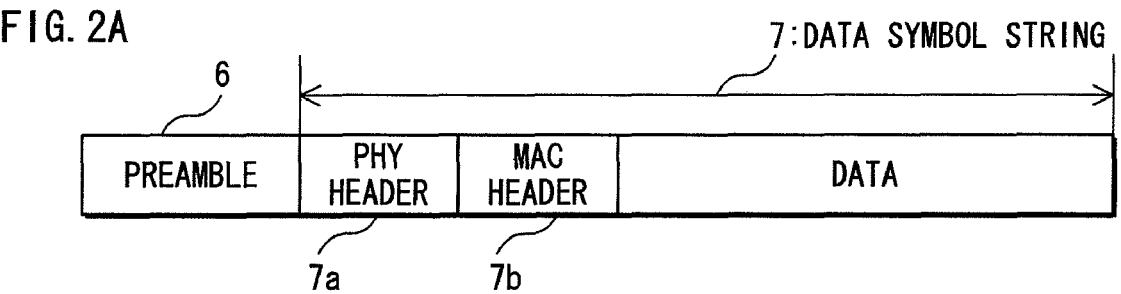
FIGS. 2A and 2B show a frame format of a radio packet signal that is transmitted/received between radio stations shown in FIG. 1.
Figure 2B:
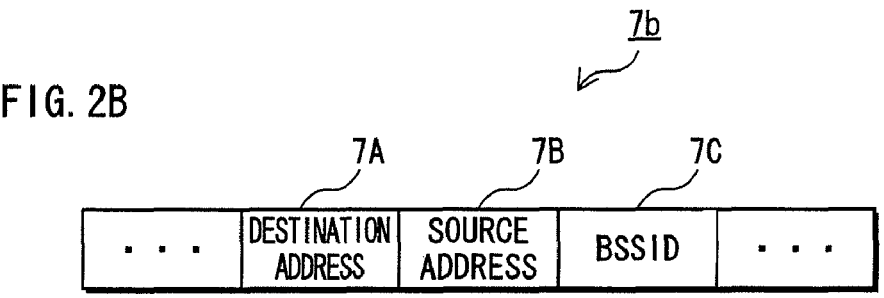

With reference to FIGS. 2A and 2B, the following provides an overview of a frame format of a radio packet signal that is transmitted/received by the radio stations shown in FIG. 1. FIGS. 2A and 2B each show the frame format of the radio packet signal that is transmitted/received by the radio stations shown in FIG. 1.

As shown in FIG. 2A, the radio packet signal is composed of a preamble signal 6 and a data symbol string 7 that follows the preamble signal 6.

The preamble signal 6 is used for synchronization detection and estimation of a channel. For example, in a wireless local area network (LAN) conforming to IEEE 802.11a, a preamble signal includes ten short training symbols and two long training symbols.

The data symbol string 7 includes a PHY header 7a, a MAC header 7b, and the like.

The PHY header 7a includes information on a modulation parameter and data lengths of dada symbols that follow the PHY header 7a.

As shown in FIG. 2B, the MAC header 7b includes a destination address 7A, a transmission source address (hereafter, "source address") 7B, BSSID 7C, and control information (not illustrated). The destination address 7A includes a MAC address of a radio station on the receiving end, and the source address 7B includes a MAC address of a radio station on the transmitting end. BSSID 7C includes a MAC address of an access point of BSS to which the radio station on the transmitting end belongs.

Note, in a wireless LAN conforming to IEEE 802.11a, each data symbol included in the data symbol string 7 is modulated using a modulation method called Orthogonal Frequency Division Multiplexing (OFDM).

<Structure of Radio Station>

Figure 3:
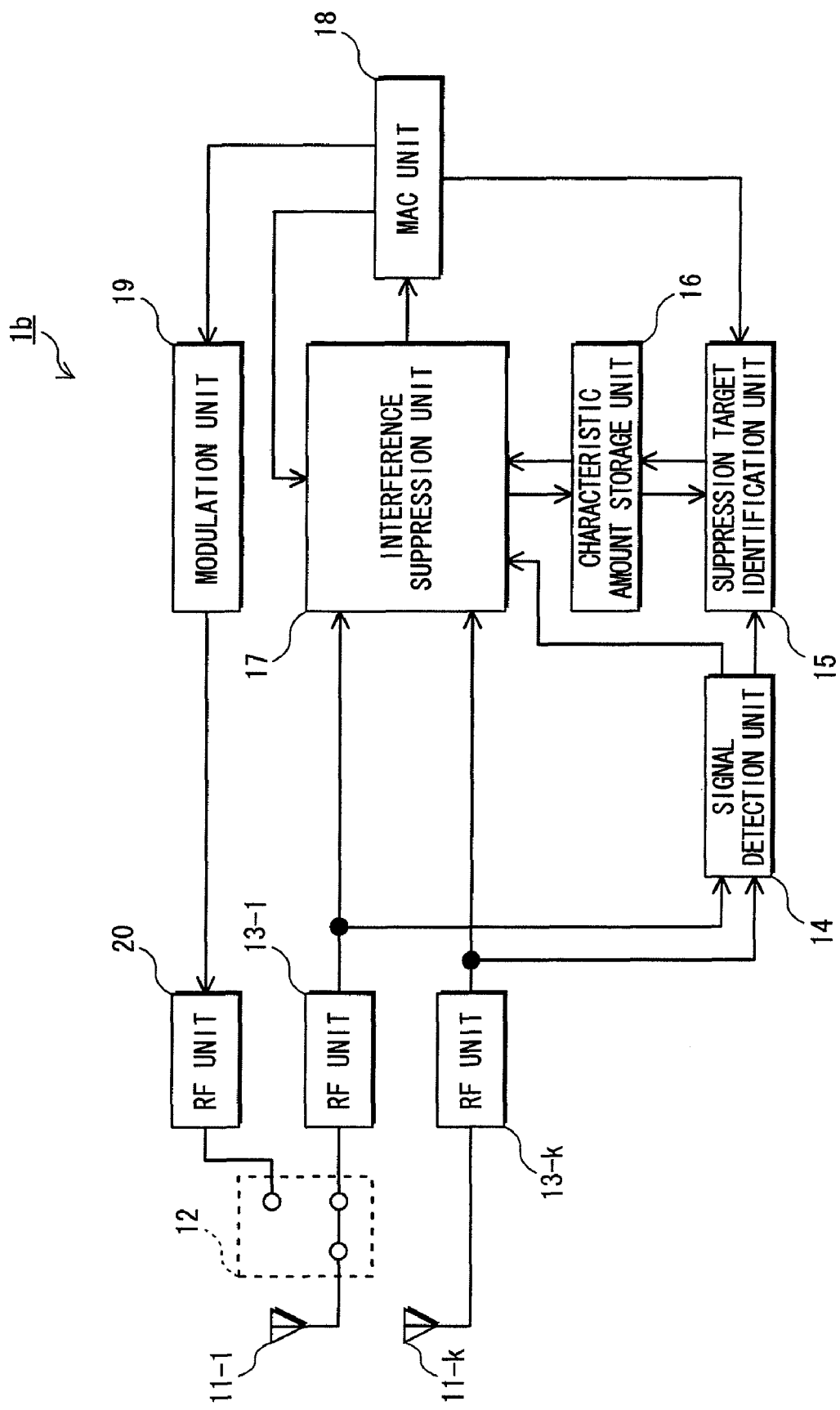
FIG. 3 shows the structure of each radio station shown in FIG. 1.

With reference to FIG. 3, the following describes the structure of the radio station (reception station) 1b shown in FIG. 1. FIG. 3 shows the structure of the reception station 1b. It should be mentioned here that radio stations other than the reception station 1b, such as the radio station 1a, have the same structure as the reception station 1b, and that descriptions thereof are hence omitted.

The reception station 1b is composed of: a plurality of antennas 11-1 to 11-k; a switch circuit 12; RF units 13-1 to 13-k; a signal detection unit 14; a suppression target identification unit 15; a characteristic amount storage unit 16; an interference suppression unit 17; a media access control (MAC) unit 18; a modulation unit 19; and an RF unit 20.

The antenna 11-1 is used as a transmission/reception antenna. The switch circuit 20 connects the antenna 11-1 to (i) the RF unit 20 when the antenna 11-1 is transmitting a signal, and (ii) the RF unit 13-1 when the antenna 11-1 is not transmitting a signal.

Each of the RF units 13-1 to 13-k down-converts a signal of a radio-frequency band (hereafter, "RF signal") that has been input by a different one of the antennas 11-1 to 11-k. Then, each of the RF units 13-l to 13-k out puts a signal of a baseband (hereafter, "baseband signal") to the signal detection unit 14 and the interference suppression unit 17.

Based on the baseband signal input by each of the RF units 13-1 to 13-k, the signal detection unit 14 detects the arrival of a signal and the completion of the arrival of the signal. In accordance with a result of the detection, the signal detection unit 14 outputs an arrival notification signal and an arrival completion notification signal to the suppression target identification unit 15.

Upon detecting the arrival of a signal, the signal detection unit 14 performs processing for detecting a preamble signal from the received (arrived) signal. The signal detection unit 14 judges that (i) there is a possibility that the received signal is a desired signal if the preamble signal is detected, and (ii) there is no possibility that the received signal is the desired signal if the preamble signal is not detected. The signal detection unit 14 outputs a type notification signal indicating a result of the above judgment to the suppression target identification unit 15.

Incidentally, the processing for detecting the preamble signal is performed in the following manner. The preamble signal includes a repetition of training symbols having signal waveforms of a predetermined pattern. The signal detection unit 14 sequentially calculates a correlation value between each baseband signal and a reference signal (a signal having the same signal waveform as training symbols on the transmitting end). If an interval at which the calculated correlation value hits the peak value is the same as an interval at which the training symbol repeats, then the signal detection unit 14 judges that it has detected the preamble signal. The signal detection unit 14 estimates a symbol timing with reference to the peak value of the correlation value, and outputs the estimated symbol timing to the interference suppression unit 17.

Specifics of the signal detection unit 14 will be described later with reference to FIG. 5.

Based on the inputs from the signal detection unit 14 and the MAC unit 18, the suppression target identification unit 15 identifies each transmission source as either (i) a non-suppression target transmission source or (ii) a suppression target transmission source.

Basically, the suppression target identification unit 15 judges that the transmission source of a signal received by the reception station 1b is a suppression target transmission source in any of the following cases: (A) a case where the timing at which the reception station 1b receives the signal is within a transmission prohibition period; (B) a case where a preamble signal has not been detected from the signal; and (C) a case where BSSID of the reception station 1b does not match BSSID included in a MAC header of the signal. In a case other than the above three cases (A), (B) and (C), the suppression target identification unit 15 judges that the transmission source of the signal is a non-suppression target transmission source.

When judging that the transmission source of the signal is a suppression target transmission source, the suppression target identification unit 15 controls an update of content stored in the characteristic amount storage unit 16.

It should be mentioned here that even in a case other than the above cases (A), (B) and (C), the suppression target identification unit 15 judges that the transmission source of the signal is a suppression target transmission source if a characteristic amount of the signal is similar to a characteristic amount of a signal that has been transmitted before by a transmission source that has been judged to be a suppression target transmission source.

Note, the transmission prohibition period is, for example, a period during which it is not permitted to perform transmission based on an inter-frame space (IFS), such as a short inter-frame space (SIFS) defined in the IEEE. 802.11a standard or the like.

The characteristic amount storage unit 16 is storage for storing therein a characteristic amount of each subband of an interfering signal, in one-to-one correspondence with suppression target transmission sources.

The characteristic amount storage unit 16 (i) temporarily stores therein a characteristic amount of a currently received signal that is input by the interference suppression unit 17, and (ii) outputs, to the suppression target identification unit 15, the characteristic amount of the signal that is currently being input by the interference suppression unit 17. Under the control of the suppression target identification unit 15, the characteristic amount storage unit 16 discards the characteristic amount of the signal input by the interference suppression unit 17, and performs processing for updating content stored therein based on the characteristic amount of the signal.

The characteristic amount storage unit 16 outputs, to the interference suppression unit 17, a characteristic amount of a signal transmitted by one transmission source, the characteristic amount being stored therein.

The characteristic amount storage unit 16 stores therein a characteristic amount management table, an example of which is shown in FIG. 4. The characteristic amount management table includes information sets each of which is composed of a "NO." field and a "CHARACTERISTIC AMOUNT" field. The "CHARACTERISTIC AMOUNT" has the following sub-fields: "SUBBAND 1", "SUBBAND 2", "SUBBAND 3", "SUBBAND 4" and "SUBBAND 5".

The "NO." fields store numbers, and the sub-fields (e.g., "SUBBAND 1") of the "CHARACTERISTIC AMOUNT"

fields store characteristic amounts of subbands of interfering signals that have been estimated by the interference suppression unit 17.

Each characteristic amount stored in the characteristic amount management table is of an interfering signal that has been transmitted before by a transmission source that has been judged by the suppression target identification unit 15 to be a suppression target transmission source. Put another way, the characteristic amount management table does not store therein any characteristic amount associated with a transmission source that has been judged by the suppression target identification unit 15 to be a non-suppression target transmission source.

The interference suppression unit 17 has two operation modes: an "interference measurement mode" and an "interference suppression mode". Under the control of the MAC unit 18, the interference suppression unit 17 switches between these two operation modes.

When operating in the "interference measurement mode", the interference suppression unit 17 measures a characteristic amount of a baseband signal input by the RF unit (13-1 to 13-k), and outputs the measured characteristic amount to the characteristic amount storage unit 16. The interference suppression unit 17 also performs processing for demodulating (i) a baseband signal received with a single antenna or (ii) a baseband signal that has been combined by means of maximal-ratio combining, then outputs the demodulated data to the MAC unit 18.

When operating in the "interference suppression mode", the interference suppression unit 17 performs, based on the characteristic amount input by the characteristic amount storage unit 16, interference suppression processing for suppressing an interfering signal from the baseband signal input by the RF unit (13-1 to 13-k). The interference suppression unit 17 then performs processing for demodulating the baseband signal and outputs the demodulated data to the MAC unit 18.

Here, the interference suppression unit 17 performs both of (i) the measurement of the characteristic amount of the baseband signal in subband units and (ii) the suppression of the interfering signal from the baseband signals in subband units.

The interference suppression unit 17 will be discussed in detail later with reference to FIG. 6.

The MAC unit 18 controls the switching between the stated two operation modes of the interference suppression unit 17 by outputting, to the interference suppression unit 17, control signals for instructing the interference suppression unit 17 to switch between these two operation modes.

Upon judging that BSSID included in a MAC header of the demodulated data input by the interference suppression unit 17 matches BSSID of the reception station 1b, the MAC unit 18 outputs a control signal that instructs the interference suppression unit 17 to switch to the "interference suppression mode". Once the interference suppression unit 17 completes the output of the demodulated data whose MAC header includes BSSID that matches BSSID of the reception station 1b, the MAC unit 18 outputs a control signal that instructs the interference suppression unit 17 to switch to the "interference measurement mode".

With the MAC unit 18 controlling the interference suppression unit 17 by means of the above control signals, the interference suppression unit 17 operates in (i) the "interference suppression mode" during a period between (a) a time when it is judged that BSSID included in the MAC header of the demodulated data matches BSSID of the reception station 1b and (b) a time when the arrival of the received signal, which is the source of the demodulated data, is completed, and (ii) "interference measurement mode" at any time other than during the stated period.

The MAC unit 18 outputs, to the suppression target identification unit 15, (i) a transmission prohibition period notification signal that indicates whether or not it is currently in the transmission prohibition period, and (ii) a same network notification signal that indicates whether or not BSSID included in the MAC header of the demodulated data matches BSSID of the reception station 1b.

By using a predetermined modulation method, the modulation unit 19 modulates transmitted data that has been input by the MAC unit 18.

The RF unit 20 up converts the demodulated baseband signal that has been input by the modulation unit 19. The RF signal acquired by the up convert is emitted via the switch circuit 12 from the antenna 11-1.

<Structure of Signal Detection Unit>

Figure 5:
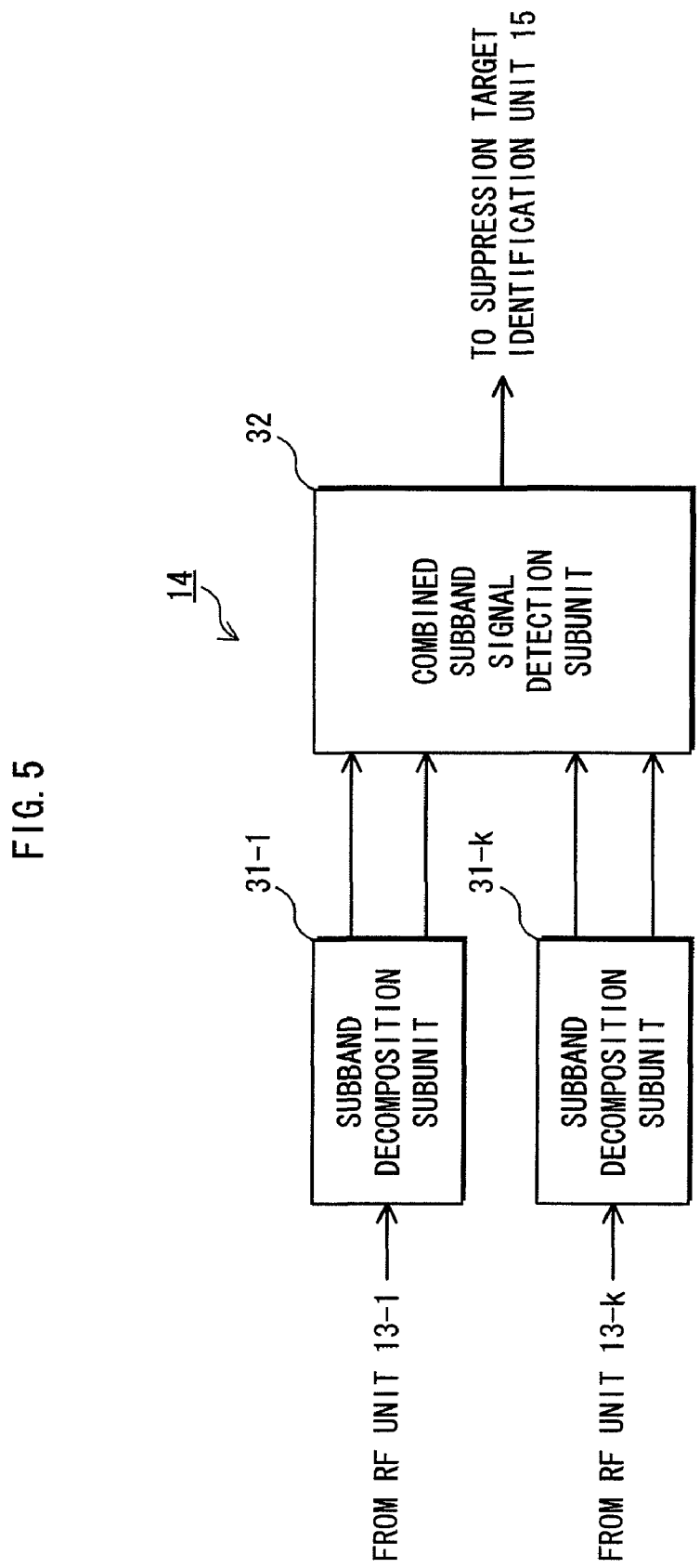
FIG. 5 shows the structure of a signal detection unit shown in FIG. 3.

The structure of the signal detection unit 14 illustrated in FIG. 3 is described now, with reference to FIG. 5. FIG. 5 shows the structure of the signal detection unit 14 illustrated in FIG. 3.

The signal detection unit 14 is composed of subband decomposition subunits 31-1 to 31-k and combined subband signal detection subunit 32.

The subband decomposition subunit 31-1 decomposes the baseband signal input by the RF unit 13-1 into a plurality of (e.g., five) subband signals each associated with a different one of subbands, and then outputs each subband signal obtained by decomposing the baseband signal to the combined subband signal detection subunit 32. It should be noted that other subband decomposition subunits (e.g., 31-k) than the subband decomposition subunit 31-1 substantially perform the same processing as the subband decomposition subunit 31-1.

The baseband signal may be decomposed into a plurality of subband signals using such methods as a fast Fourier transform (FFT), a wavelet transform and a filter bank.

Instead of providing the subband decomposition subunits 51-1 to 51-k in one-to-one correspondence with antennas (inputs), it is permissible to provide one subband decomposition subunit that can be used in a time-division manner.

In accordance with the subband signals input by the subband decomposition subunits 31-1 to 31-k, the combined subband signal detection subunit 32 combines subband signals associated with the same subband with one another. Then, the combined subband signal detection subunit 32 detects an amount of change in a power value per subband, an amount of change in a correlation between subband signals (a between-antenna correlation) or the like. Thereafter, by using the detected amount of change in the power value, the detected amount of change in the correlation or the like, the combined subband signal detection subunit 32 detects (i) the arrival of a signal and (ii) the completion of the arrival of the signal. Further, the combined subband signal detection subunit 32 performs processing for detecting a preamble signal on a subband-by-subband basis, and judges if there is a possibility that the received signal is a desired signal.

The above structure allows detecting a change in a reception status in an integrated manner, with reference to the power value of each subband, the between-antenna correlation, etc. This makes it possible to detect an interfering signal with higher accuracy.

For example, in a case where the reception station 1b receives an interfering signal that has been transmitted using an adjacent channel, a large amount of power is measured in a subband close to the adjacent channel. This, however, does not render a total amount of power measured within the entire bandwidth used for reception large; consequently, there may be times when it is difficult to detect the arrival of a signal with high accuracy. Contrarily, it is possible to detect a signal with high accuracy by detecting the power of every subband so as to, for example, detect the arrival of a signal when there is a predetermined number or more of subbands whose powers each exceed a predetermined threshold value.

The structure of the signal detection unit 14 is not limited to the one illustrated in FIG. 5. The signal detection unit 14 may not include any subband decomposition subunits; in this case, it is permissible to detect the arrival of a signal and the completion of the arrival of the signal by detecting an amount of change in a power value of a baseband signal input by the RF unit (13-1 to 13-$k$), an amount of change in the between-antenna correlation, etc. It is also permissible to detect a preamble signal from every baseband signal.

<Structure of Interference Suppression Unit>

Figure 6:
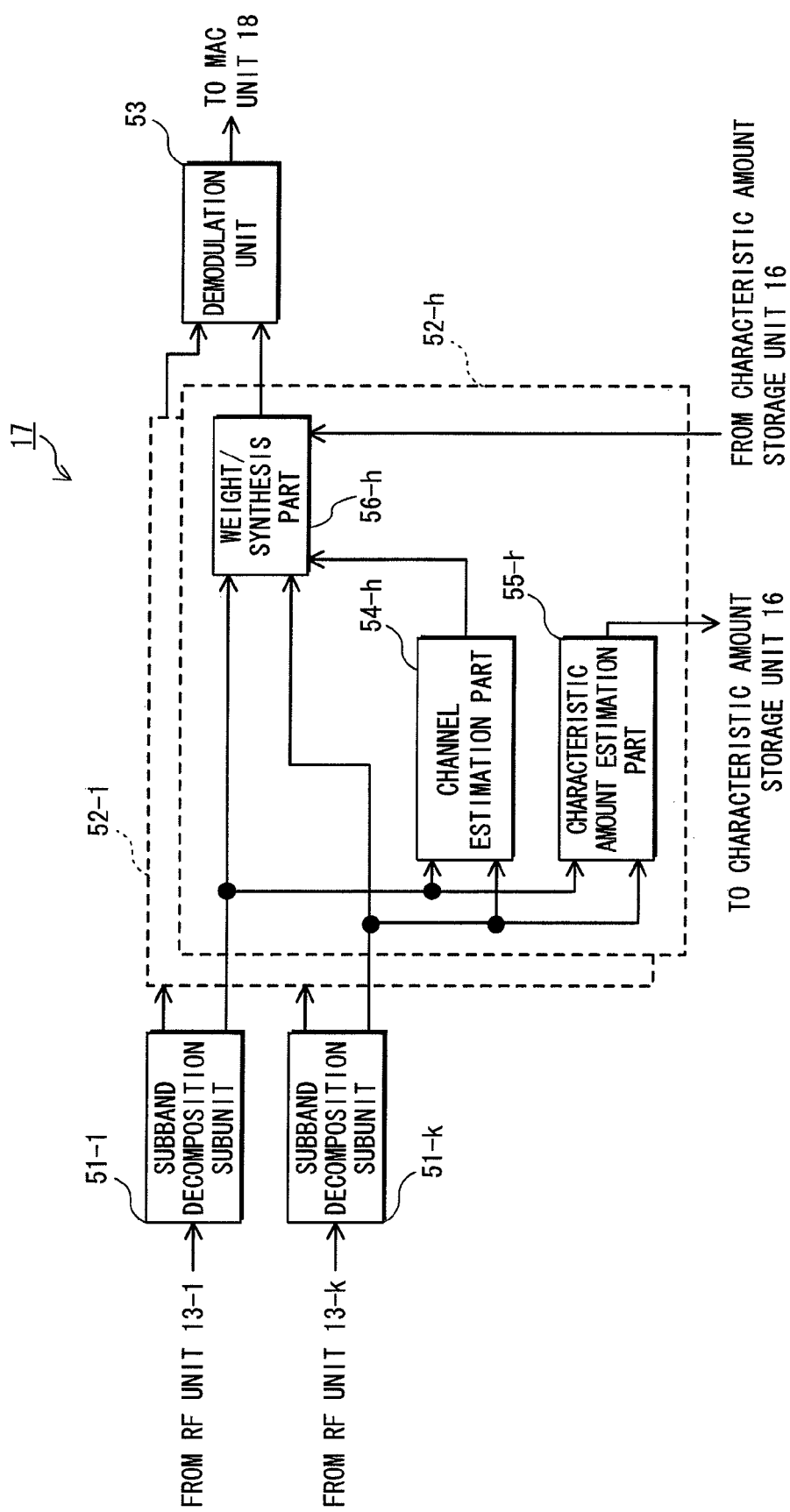
FIG. 6 shows the structure of an interference suppression unit shown in FIG. 3.

With reference to FIG. 6, the following describes the structure of the interference suppression unit 17 illustrated in FIG. 3. FIG. 6 shows the structure of the interference suppression unit 17. In FIG. 6, a multicarrier modulation method, such as an OFDM method, is employed as a modulation method. It should be noted here that the interference suppression unit 17 is the technology that the applicants of the present invention submitted as a patent application prior to the present application (see International Publication Pamphlet No. 2006-003776).

The interference suppression unit 17 is composed of subband decomposition subunits 51-1 to 51-$k$, subband processing subunits 52-1 to 52-$h$, and a demodulation subunit 53. A number of the subband processing subunits 52-1 to 52-$h$ is, for example, five.

The subband decomposition subunit 51-1 decomposes the baseband signal input by the RF unit 13-1 into a plurality of (here, "h") subband signals each associated with a different one of subbands, and then outputs the subband signals obtained by decomposing the baseband signal to the subband processing subunits 52-1 to 52-$h$, respectively. It should be noted that other subband decomposition subunits (e.g., 51-$k$) than the subband decomposition subunit 51-1 substantially perform the same processing as the subband decomposition subunit 51-1.

The baseband signal may be decomposed into a plurality of subband signals using such methods as FFT, a wavelet transform and a filter bank.

Instead of providing the subband decomposition subunits 51-1 to 51-$k$ in one-to-one correspondence with antennas (inputs), it is permissible to provide one subband decomposition subunit that can be used in a time-division manner.

The subband processing subunit 52-$h$ combines subband signals associated with the same subband with one another. Then, the subband processing subunit 52-$h$ measures a characteristic amount of the baseband signal on a subband-by-subband basis, and suppresses an interfering signal from the baseband signal. Other subband processing subunits (e.g., the subband processing subunit 52-1) substantially performs the same processing as the subband processing subunit 52-$h$.

The demodulation subunit 53 combines the signals input by the subband processing subunits 52-1 to 52-$h$, demodulates the combined signal, and outputs the demodulated data to the MAC unit 18.

The subband processing subunit 52-$h$ includes a channel estimation part 54-$h$, a characteristic amount estimation part 55-$h$ and a weight/synthesis part 56-$h$.

The channel estimation part 54-$h$ estimates a channel via which a signal is transmitted, based on a known signal included in a subband signal input by the subband decomposition subunit (51-1 to 51-$k$). Then, the channel estimation part outputs a channel estimation matrix H to the weight/synthesis part 56-$h$.

During the "interference measurement mode", the characteristic amount estimation part 55-$h$ (i) calculates a covariance matrix Ruu which is a correlation between subband signals input by the subband decomposition subunit (51-1 to 51-$k$), and (ii) outputs, to the characteristic amount storage unit 16, the calculated covariance matrix Ruu as a characteristic amount of the baseband signal associated with these subband signals. Note, the covariance matrix includes information on the correlation between the subband signals (the between-antenna correlation) and power values of the subband signals.

During the "interference measurement mode", the weight/synthesis part 56-$h$ (i) weights and synthesizes the subband signals input by the channel estimation part 54-$h$, with use of the channel estimation matrix H input by the channel estimation part 54-$h$, and (ii) outputs the weighted/synthesized signals to the demodulation unit 53.

During the "interference suppression mode", the subband decomposition subunits 51-1 to 51-$k$ output the subband signals to the weight/synthesis part 56-$h$. All of the subband signals input to the weight/synthesis part 56-$h$ are expressed in a single matrix (hereafter, "subband matrix") r. The weight/synthesis part 56-$h$ (i) weights and synthesizes the subband signals by calculating [Formula 1] below, with use of the channel estimation matrix H and the characteristic amounts (the covariance matrix Ruu) which are respectively input by the channel estimation part 54-$h$ and the characteristic amount storage unit 16, and (ii) outputs, to the demodulation unit 53, a signal v obtained by suppressing interfering signal components.

$$v = RssH^*(HRssH^* + Ruu)^{-1} r \qquad [\text{Formula 1}]$$

Note, H* denotes a complex conjugate transposition of H, and $(HRssH^* + Ruu)^{-1}$ denotes an inverse matrix of $(HRssH^* + Ruu)$.

A matrix Rss denotes a covariance matrix of a signal s transmitted by the transmission station, and can be obtained from the statistical characteristics of a transmitted signal.

<Interference Measurement Processing and Interference Suppression Processing>

Figure 7:
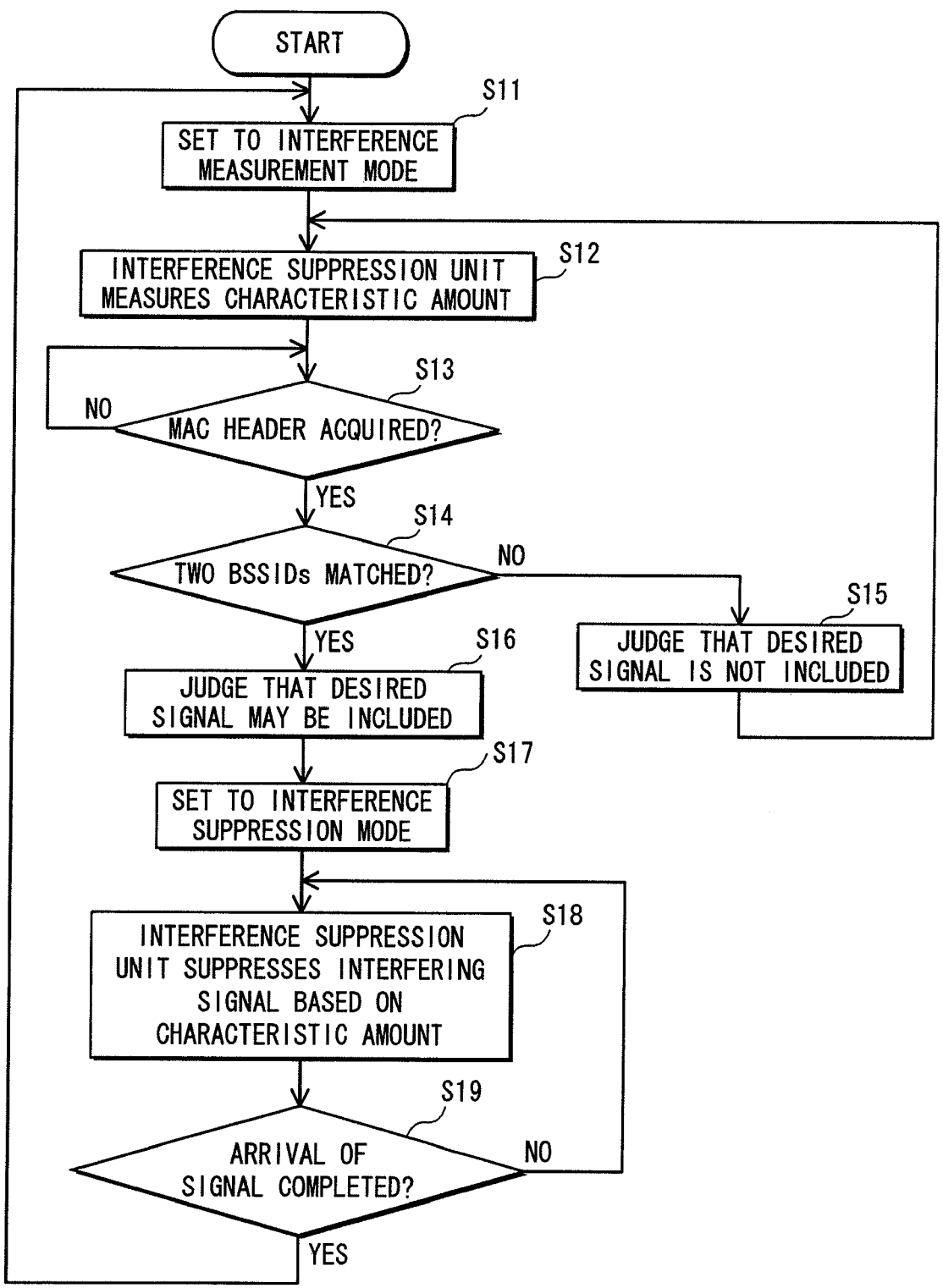
FIG. 7 is a flowchart of interfering measurement processing and interference suppression processing performed by the radio station shown in FIG. 3.

With reference to FIG. 7, the following describes the interference measurement processing and the interference suppression processing performed by the radio station (reception station) 1$b$ illustrated in FIG. 3. FIG. 7 is a flowchart of the interference measurement processing and the interference suppression processing performed by the reception station 1$b$.

The MAC unit 18 performs control for setting the operation mode of the interference suppression unit 17 to the "interference measurement mode" (Step S11). The interference suppression unit 17, whose operation mode is now set to the "interference measurement mode", (i) measures a characteristic amount of the baseband signal input by the RF unit (13-1 to 13-$k$), (ii) demodulates the baseband signal, and (iii) outputs demodulated data to the MAC unit 18 (Step S12).

The MAC unit 18 performs processing for acquiring a MAC header from the demodulated data input by the interference suppression unit 17 (Step S13). Until the MAC header is acquired (the NO branch of Step S13), the MAC unit 18 continues to perform the processing for acquiring the MAC header from the demodulated data.

Once the MAC header is acquired (the YES branch of Step S13), the MAC unit 18 compares BSSID included in the MAC header with BSSID of the reception station 1*b* (Step S14).

When a result of the comparison shows that these BSSIDs do not match each other (the NO branch of Step S14), the MAC unit 18 judges that the received signal does not include a desired signal (Step S15). The reception station 1*b* returns to the processing of Step S12, and continues to measure the characteristic amount of the baseband signal input by the RF unit (13-1 to 13-*k*).

When the result of the comparison shows that these BSSIDs match each other (the YES branch of Step S14), the MAC unit 18 judges that there is a possibility that the received signal includes a desired signal (Step S16).

The MAC unit 18 performs control for setting the operation mode of the interference suppression unit 17 to the "interference suppression mode" (Step S17). Accordingly, the operation mode of the interference suppression unit 17 is switched from the "interference measurement mode" to the "interference suppression mode". At this point, the characteristic amount storage unit 16 has already output, to the interference suppression unit 17, the characteristic amount of the signal transmitted by one transmission source, the characteristic amount being stored therein. The interference suppression unit 17 (i) suppresses an interfering signal from the baseband signal input by the RF unit (13-1 to 13-*k*) in accordance with the characteristic amount input by the characteristic amount storage unit 16, (ii) demodulates the baseband signal, and (iii) outputs the demodulated data to the MAC unit 18 (Step S18).

The MAC unit 18 judges whether or not the arrival of a currently received signal is completed, based on data lengths included in the modulated data (Step S19).

When the currently received signal is still arriving (the NO branch of Step S19), the reception station 1*b* returns to the processing of Step S18 and continues to perform such processing as the processing for suppressing an interfering signal from a baseband signal input by the RF unit (13-1 to 13-*k*).

When the arrival of the currently received signal has been completed (the YES branch of Step S19), the reception station 1*b* returns to the processing of Step S11. Accordingly, the MAC unit 18 performs control for switching the operation mode of the interference suppression unit 17 to the "interference measurement mode", and the interference suppression unit 17 restarts operations in the "interference measurement mode".

<Suppression Target Identification Processing>

Figure 8:
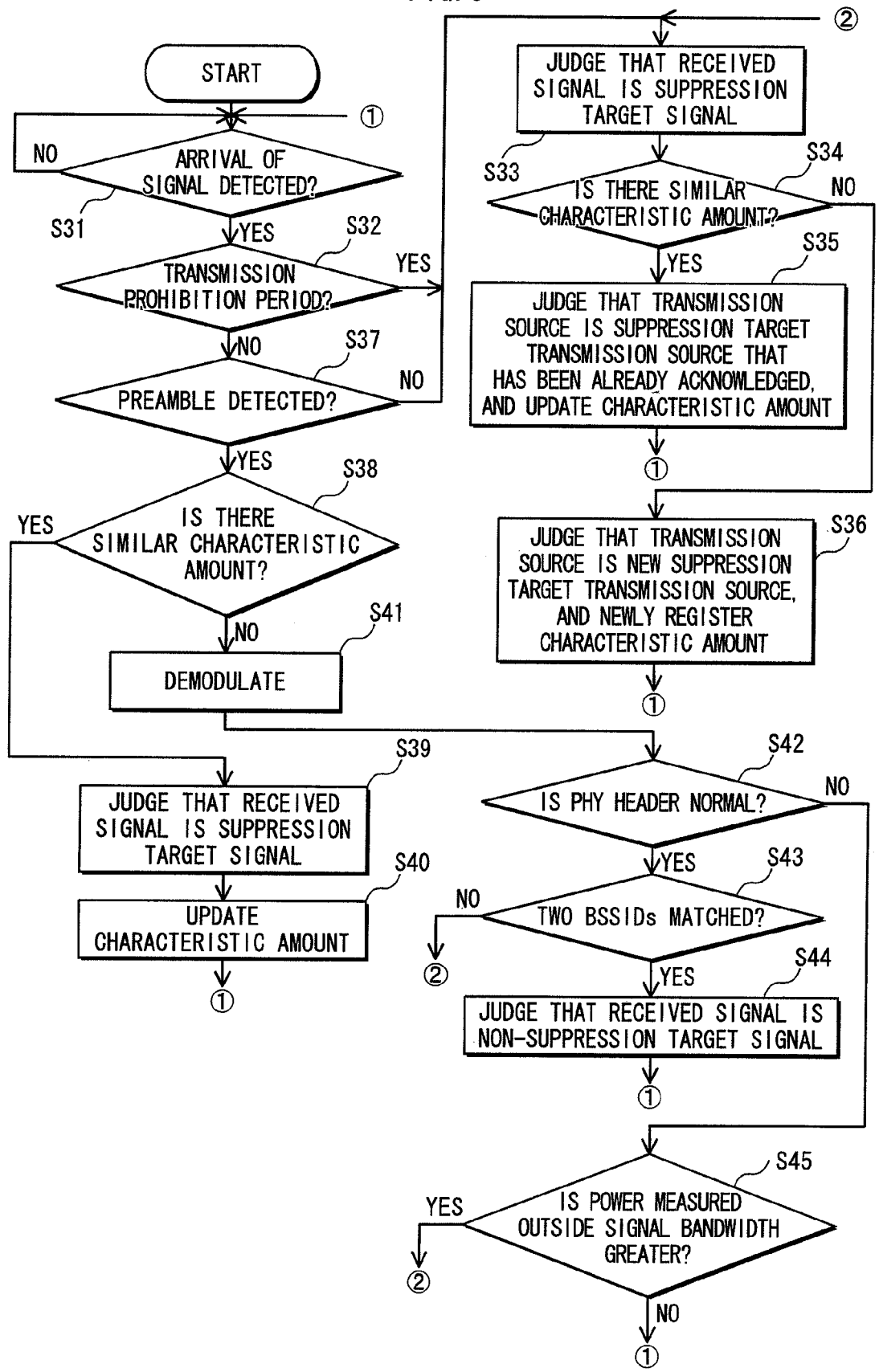
FIG. 8 is a flowchart of suppression target identification processing performed by the radio station shown in FIG. 3.

With reference to FIG. 8, the following describes the suppression target identification processing performed by the radio station (reception station) 1*b* illustrated in FIG. 3. FIG. 8 is a flowchart of the suppression target identification processing performed by the reception station 1*b*.

The signal detection unit 14 performs processing for detecting the arrival of a signal based on a baseband signal. The suppression target identification unit 15 judges whether or not a signal has arrived based on an arrival notification signal input by the signal detection unit 14 (Step S31).

Once the arrival notification signal is input from the signal detection unit 14 to the suppression target identification unit 15, the suppression target identification unit 15 judges that a signal has arrived (the YES branch of Step S31) and performs processing of Step S32.

The MAC unit 18 judges whether or not it is currently within the transmission prohibition period, and outputs, to the suppression target identification unit 15, a transmission prohibition period notification signal indicating a result of this judgment. Based on the transmission prohibition period notification signal input by the MAC unit 18, the suppression target identification unit 15 judges whether or not the timing at which the arrival notification signal is input by the signal detection unit 14 is within the transmission prohibition period (Step S32).

In a case where the arrival notification signal is input within the transmission prohibition period (the YES branch of Step S32), the suppression target identification unit 15 judges that the currently received signal is a suppression target signal and that the transmission source of this signal is a suppression target transmission source (Step S33).

Then, the suppression target identification unit 15 judges whether or not a characteristic amount of a currently received signal, which has been input within the measured bandwidth by the characteristic amount storage unit 16, is similar to any of characteristic amounts stored in the characteristic amount management table of the characteristic amount storage unit 16 (Step S34). Here, the judgment about the similarity between a characteristic amount of the currently received signal and a characteristic amount of another signal whose characteristic amount has been stored in the reception station 1*b* is made by using (i) a between-antenna correlation and (ii) the temporal characteristics of a power change, which are included as information in a covariance matrix. When a sum of differences in between-antenna correlations of the two signals is equal to or smaller than a predetermined value, the suppression target identification unit 15 judges that the between-antenna correlations of the two signals are similar to each other. When a sum of differences in sample points of the temporal characteristics pertaining to power changes of the two signals is equal to or smaller than a predetermined value, the suppression target identification unit 15 judges that the temporal characteristics pertaining to the power changes of the two signals are similar to each other. The characteristic amounts of the two signals are judged to be similar to each other when both of their between-antenna correlations and temporal characteristics of the power changes are similar to each other. It should be noted here that the judgment about the similarity between the characteristic amounts of the two signals may be made by using a different method than the one described above.

When the characteristic amount of the currently received signal is similar to any of the characteristic amounts stored in the characteristic amount management table of the characteristic amount storage unit 16 (the YES branch of Step S34), the suppression target identification unit 15 judges that the transmission source of the currently received signal is one of the suppression target transmission sources that have already been stored in the characteristic amount management table of the characteristic amount storage unit 16. Accordingly, the suppression target identification unit 15 (i) selects, from the characteristic amounts stored in the characteristic amount management table of the characteristic amount storage unit 16, the characteristic amount that is similar to the characteristic amount of the currently received signal, and (ii) updates the selected characteristic amount to the characteristic amount of the currently received signal (Step S35). Then, processing of Step S31 onward are performed.

When the characteristic amount of the currently received signal is not similar to any of the characteristic amounts stored in the characteristic amount management table of the characteristic amount storage unit 16 (the NO branch of Step S34), the suppression target identification unit 15 judges that the transmission source of the currently received signal is a new suppression target transmission source. Accordingly, the suppression target identification unit 15 newly registers the characteristic amount of the currently received signal in the characteristic amount management table of the characteristic amount storage unit 16 (Step S36). Then, the processing of Step S31 onward are performed.

In a case where the arrival notification signal is input at any time other than during the transmission prohibition period (the NO branch of Step S32), processing of Step S37 is performed.

The signal detection unit 14 has been performing the processing for detecting the preamble signal from the received signal since the arrival of the signal was detected. Based on a result of the detection of the preamble signal, the signal detection unit 14 outputs a type notification signal to the suppression target identification unit 15. Based on the type notification signal, the suppression target identification unit 15 judges whether or not the preamble signal has been detected (Step S37).

When the signal detection unit 14 does not detect the preamble signal (the NO branch of Step S37), the suppression target identification unit 15 judges that the currently received signal is a suppression target signal and that the transmission source of the currently received signal is a suppression target transmission source (Step S33). Then, processing of Step S34 onward are performed.

When the signal detection unit 14 detects the preamble signal (the YES branch of Step S37), the suppression target identification unit 15 judges whether or not a characteristic amount of a currently received signal, which has been input through outside the measured bandwidth by the characteristic amount storage unit 16, is similar to any of the characteristic amounts stored in the characteristic amount management table of the characteristic amount storage unit 16 (Step S38).

When the characteristic amount of the currently received signal is similar to any of the characteristic amounts stored in the characteristic amount management table of the characteristic amount storage unit 16 (the YES branch of Step S38), the suppression target identification unit 15 judges that the currently received signal is a suppression target signal and that the transmission source of the currently received signal is a suppression target transmission source (Step S39). Accordingly, the suppression target identification unit 15 (i) selects, from the characteristic amounts stored in the characteristic amount management table of the characteristic amount storage unit 16, the characteristic amount that is similar to the characteristic amount of the currently received signal, and (ii) updates the selected characteristic amount to the characteristic amount of the currently received signal (Step S40) Then, processing of Step S31 onward are performed.

When the characteristic amount of the currently received signal is not similar to any of the characteristic amounts stored in the characteristic amount management table of the characteristic amount storage unit 16 (the NO branch of Step S38), the interference suppression unit 17 performs demodulation processing based on the baseband signal input by the RF unit (13-1 to 13-*k*), and then outputs demodulated data to the MAC unit 18 (Step S41).

The MAC unit 18 judges whether or not a PHY header that is included in the demodulated data input by the interference suppression unit 17 is normal, and outputs a result of this judgment to the suppression target identification unit 15. The suppression target identification unit 15 judges, based on the result of the judgment input by the MAC unit 18, whether or not the PHY header is normal (Step S42).

When a PHY header is judged to be normal (the YES branch of Step S42), processing of Step S43 is performed.

The MAC unit 18 compares BSSID included in a MAC header of the demodulated data with BSSID of the reception station 1*b*, and outputs, to the suppression target identification unit 15, a same network notification signal indicating a result of the comparison. The suppression target identification unit 15 judges, in accordance with the same network notification signal, whether or not these two BSSIDs match each other (Step S43).

When the two BSSIDs match each other (the YES branch of Step S43), the suppression target identification unit 15 judges that the currently received signal is a non-suppression target signal and that the transmission source of the currently received signal is a non-suppression target transmission source. Accordingly, the suppression target identification unit 15 makes the characteristic amount storage unit 16 discard the characteristic amount of the currently received signal which has been temporarily stored therein (Step S44). Then, processing of Step S31 onward are performed.

When the two BSSIDs do not match each other (the NO branch of Step S43), the suppression target identification unit 15 judges that the currently received signal is a suppression target signal and that the transmission source of the currently received signal is a suppression target transmission source (Step S33). Then, processing of Step S34 onward are performed.

When the PHY header is not judged to be normal (the NO branch of Step S42), the suppression target identification unit 15 judges whether or not the power measured outside the signal bandwidth is greater than the power measured within the signal bandwidth (Step S45).

When the power measured outside the signal bandwidth is greater than the power measured within the signal bandwidth (the YES branch of Step S45), the suppression target identification unit 15 judges, for example, that an interfering signal has arrived at an adjacent channel. Accordingly, the suppression target identification unit 15 judges that the currently received signal is a suppression target signal, and that the transmission source of the currently received signal is a suppression target transmission source (Step S33). Then, processing of Step S34 onward are performed.

When the power measured outside the signal bandwidth is equal to or smaller than the power measured within the signal bandwidth (the NO branch of Step S45), the suppression target identification unit 15 judges, for example, that an error has occurred in demodulating the PHY header because the power measured within the signal bandwidth is small. Accordingly, the suppression target identification unit 15 makes the characteristic amount storage unit 16 discard the characteristic amount of the currently received signal which has been temporarily stored therein. Then, processing of Step S31 onward are performed.

<Reception Processing>

Figure 9:
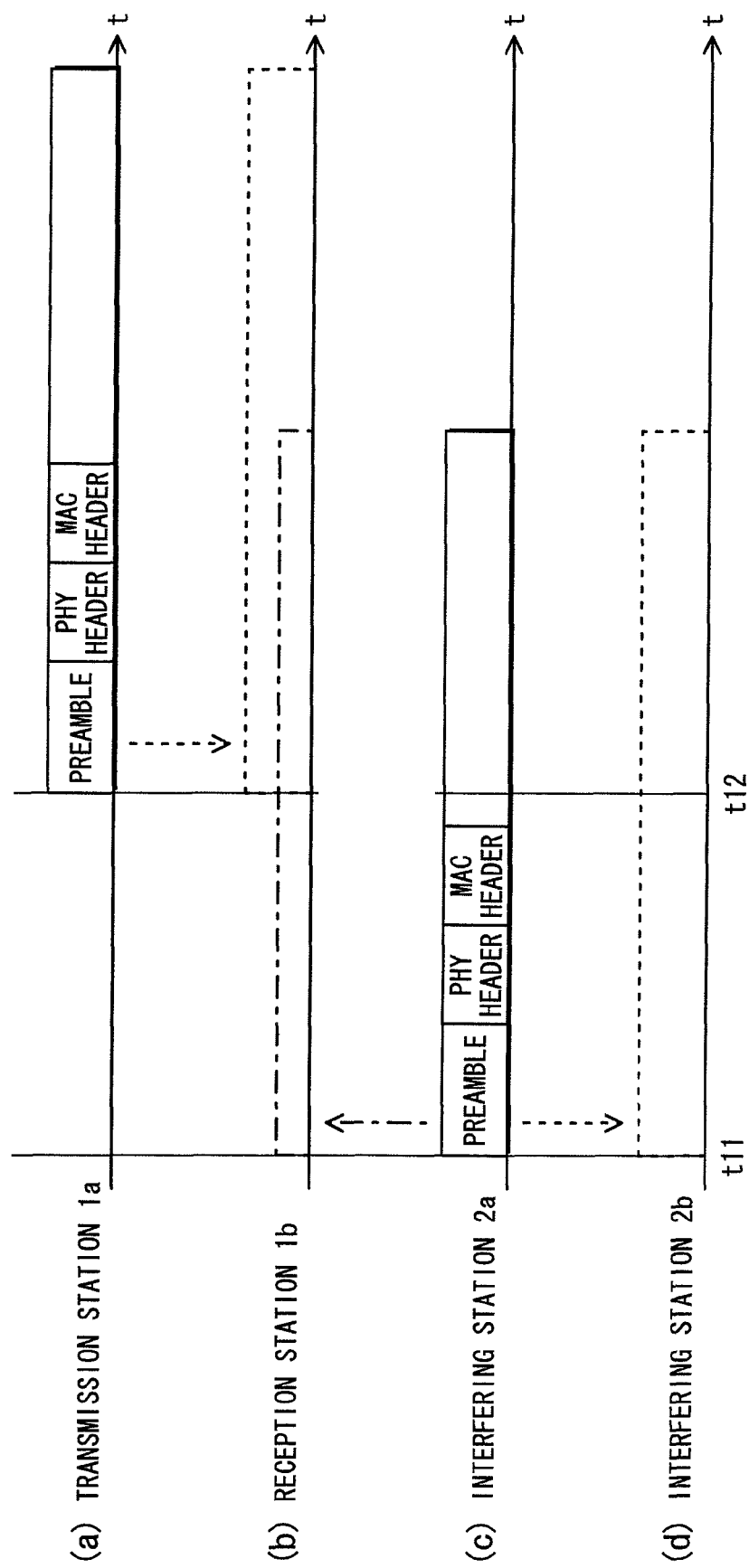
FIG. 9 is a diagram for explaining exemplary operations of reception processing performed by the radio stations shown in FIG. 1.

With reference to FIG. 9, the following describes an example of reception processing performed by the radio station (reception station) 1*b* of the radio communication system illustrated in FIG. 1. FIG. 9 is a diagram for explaining exemplary operations of the reception processing performed by the reception station 1*b* illustrated in FIG. 1.

Provided that the interfering station 2*a* transmits a first signal to the interfering station 2*b* at a time t11, not only the interfering station 2*b* but also the reception station 1*b* receives the first signal.

In the reception station 1*b*, the signal detection unit 14 detects (i) the arrival of the signal from, for example, an increase in a received power and (ii) a preamble signal from the currently received signal. The MAC unit 18 judges that (i) a PHY header of the currently received signal is normal and (ii) BSSID included in a MAC header of the currently received signal does not match BSSID of the reception station 1*b*.

In view of the above, the suppression target identification unit 15 judges that the currently received signal is a suppression target signal and that the transmission source of the currently received signal is a suppression target transmission source. Then, the suppression target identification unit 15 newly registers a characteristic amount of the currently received signal, which has been measured by the interference suppression unit 17, in the characteristic amount storage unit 16.

It should be reminded here that, since the above two BSSIDs do not match each other, the interference suppression unit 17 continues to operate in the "interference measurement mode".

In the reception station 1b, at a time 12t, the signal detection unit 14 detects the arrival of a new signal from, for example, an increase in a received power. The signal detection unit 14 also detects a preamble signal from the currently received signal. The MAC unit 18 judges that (i) a PHY header of the currently received signal is normal and (ii) BSSID included in a MAC header of the currently received signal matches BSSID used by the reception station 1b.

Accordingly, the MAC unit 18 performs control for switching the operation mode of the interference suppression unit 17 to the "interference suppression mode".

The interference suppression unit 17 suppresses an interfering signal from the currently received signal, in accordance with the characteristic amount input by the characteristic amount storage unit 16.

<<Embodiment 2>>

Below is a description of Embodiment 2 of the present invention, with reference to the accompanying drawings.

In Embodiment 1, a reception station identifies a transmission source of a signal it is currently receiving as either a suppression target transmission source or a non-suppression target transmission source, based on (i) the timing at which the reception station receives the signal and (ii) BSSID included in a MAC header of the signal.

As opposed to this, in Embodiment 2, a transmission source of a signal that a reception signal has received before is identified as either a suppression target transmission source or a non-suppression target transmission source, by comparing each transmission source of the signal that the reception station has received before with each transmission source of a signal that a transmission station has received before.

<System Structure>

Figure 10:
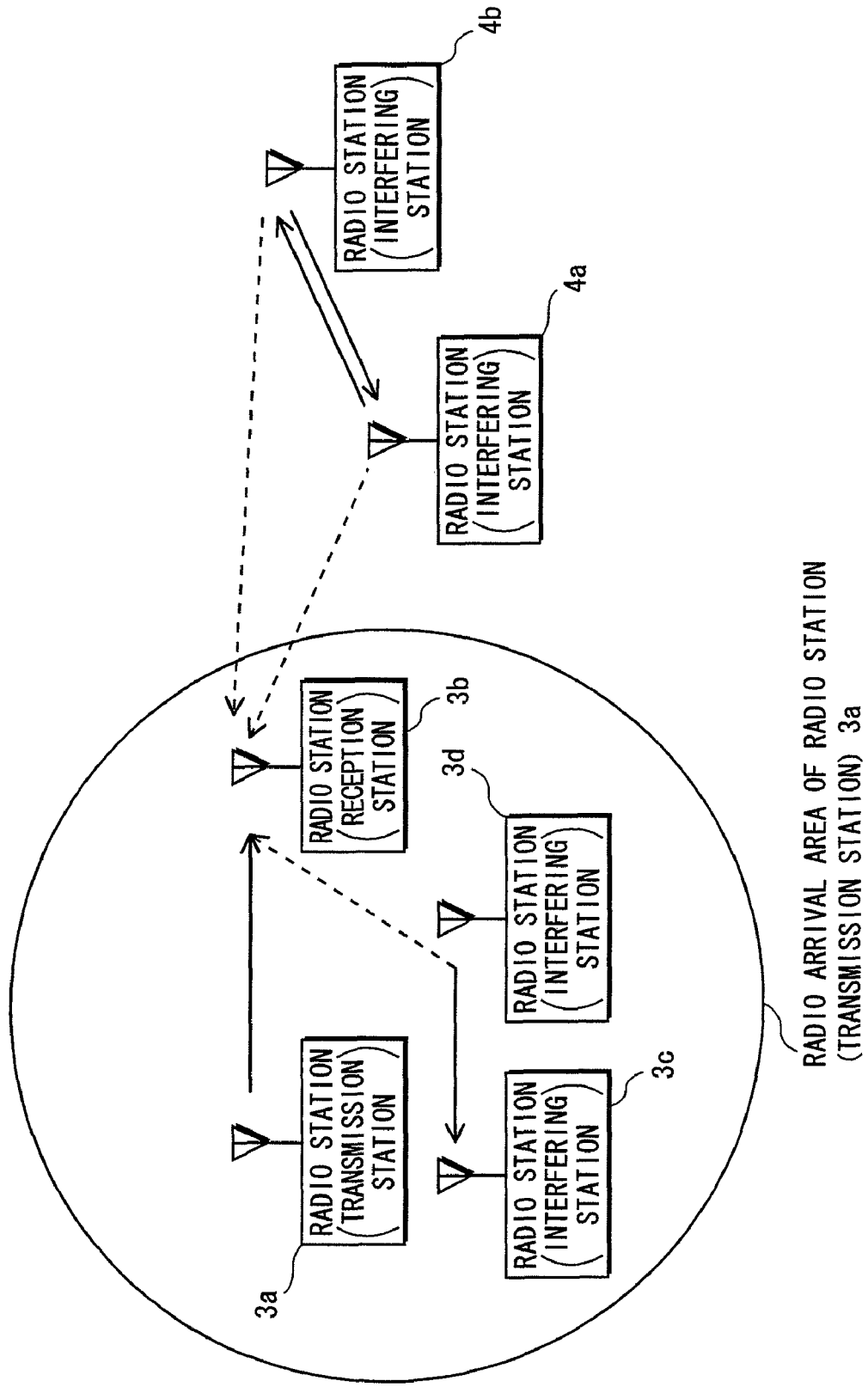
FIG. 10 is a system structural diagram showing a radio communication system of Embodiment 2.

The following describes a radio communication system of Embodiment 2 with reference to FIG. 10. FIG. 10 shows the structure of the radio communication system of Embodiment 2.

It should be noted here that the radio communication system of Embodiment 2 employs a CSMA/CA method as an access method.

FIG. 10 shows radio stations 3a, 3b, 3c, 3d, 4a and 4b. The radio stations 3b, 3c and 3d are located within a radio arrival area of the radio station 3a (i.e., located within reach of radio waves transmitted by the radio station 3a). The radio station 4a and 4b are not located within the radio arrival area of the radio station 3a. It should be noted here that every radio station is assumed to be able to transmit radio waves by the same distance.

Since the radio communication system employs the CSMA/CA method, the radio stations 3b, 3c and 3d, which are located within the radio arrival area of the radio station 3a, never transmit radio packet signals while the radio station 3a is transmitting a radio packet signal.

As opposed to this, the radio stations 4a and 4b, which are located outside the radio arrival area of the radio station 3a, cannot detect radio packet signals transmitted by the radio station 3a, even by means of carrier sensing. Hence, there is a case where the radio stations 4a and 4b transmit radio packet signals while the radio station 3a is transmitting a radio packet signal.

The radio stations 3a and 3b are assumed to be a transmission station and a reception station, respectively. Other radio stations 3c, 3d, 4a and 4b are assumed to be interfering stations.

The reception station 3b has received before radio packet signals transmitted by the transmission station 3a and the interfering stations 3c, 3d, 4a and 4b. The reception station 3b thereby stores therein a first surrounding terminal list in which MAC addresses of the transmission station 3a and the interfering stations 3c, 3d, 4a and 4b are listed.

The transmission station 3a has received before radio packet signals transmitted by the reception station 3b and the interfering stations 3c and 3d. The transmission station 3a thereby stores therein a second surrounding terminal list in which MAC addresses of the reception station 3b and the interfering stations 3c and 3d are listed.

Figure 11:
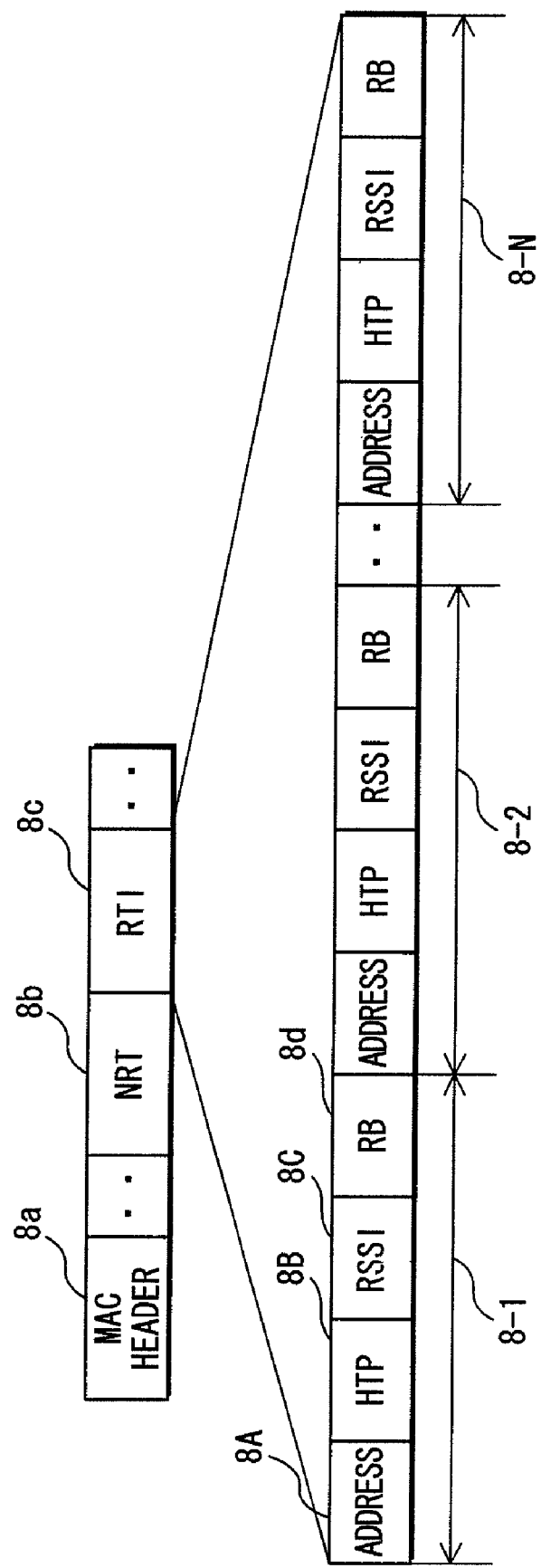
FIG. 11 shows a frame format of an RTI request frame and an RTI response frame that are transmitted/received between radio stations shown in FIG. 10.

The reception station 3b acquires the second surrounding terminal list from the transmission station 3a based on a recognizable terminals information (RTI) request packet or an RTI response packet (discussed later), examples of which are shown in FIG. 11. Then, the reception station 3b compares the first surrounding terminal list with the second surrounding terminal list. Out of the radio stations listed in the first surrounding terminal list (except for the transmission station), the reception station 3b identifies (i) the interfering stations 3c and 3d, which are listed in the second surrounding terminal list acquired from the transmission station 3a, as non-suppression target transmission sources, and (ii) the interfering stations 4a and 4b, which are not listed in the second surrounding terminal list, as suppression target transmission sources.

In order to suppress an interfering signal superimposed on a desired signal, the reception station 3b selects one transmission source out of the above-described suppression target transmission sources, and suppresses the interfering signal from a received signal by using a characteristic amount of a signal associated with the selected transmission source.

As set forth, a characteristic amount of an interfering signal which is used to suppress an interfering signal from a received signal is selected only from suppression target transmission sources, but not from non-suppression target transmission sources.

Therefore, the above structure increases the probability that a characteristic amount of a signal which is used to suppress an interfering signal from a received signal is a characteristic amount of an interfering signal that has been actually superimposed on a desired signal. This makes it possible to effectively suppress the interfering signal from the received signal.

<Frame Format of RTI Request Frame and RTI Response Frame>

With reference to FIG. 11, the following describes an overview of the frame format of the RTI request frame and the RTI response frame that are transmitted/received between the radio stations of FIG. 10. FIG. 11 shows the frame format of the RTI request frame and the RTI response frame that are transmitted/received between the radio stations of FIG. 10.

As shown in FIG. 11, the RTI request frame and the RTI response frame each include a MAC header 8a, NRT 8b and RTI 8c.

The MAC header 8a includes a destination address and a source address.

A number of recognizable terminals (NRT) 8b is a field for storing (i) a total number of MAC addresses of transmission stations of signals that have arrived at its own station and (ii) a total number of MAC addresses of reception stations to which the signals that have arrived at the own station were addressed. Note, if there are more than one identical MAC addresses, they will be counted as one MAC address.

RTI 8c is a field for storing, in correspondence with each radio station (i.e., each of the transmission stations and the reception stations of the signals that have arrived at the own station), an address 8A, HTP 8B, RSSI 8C, and RB 8D.

The address 8A is a field for storing MAC addresses of the radio stations.

A hidden terminal possibility (HTP) 8B is a field for storing information indicating a possibility that each radio station, whose MAC address is stored in the corresponding address 8A, is a hidden terminal. Every radio station bugs signals exchanged between surrounding radio stations; when it only receives a response request signal and cannot receive a response signal in reply to the response request signal, it judges that there is a possibility that the radio station to which the stated response request signal was addressed is a hidden terminal. HTP 8B stores therein (i) "1" when the corresponding address 8A stores a MAC address of a radio station that has a possibility of being a hidden terminal, and (ii) "0" when the corresponding address 8A stores therein a MAC address of a radio station that does not have a possibility of being a hidden terminal. Note, Japanese Laid-Open Patent Application No. 2002-217913 exemplarily discloses technology for acknowledging a possibility of an existence of a hidden terminal.

A received signal strength indication (RSSI) 8C is a field for storing a power value of a signal received from the radio station whose MAC address is stored in the corresponding address 8A. It should be noted here that in Embodiment 2, the value stored in RSSI 8C is not particularly used.

If the own station and the radio station whose MAC address is stored in the corresponding address 8A have exchanged, with each other, a frame that includes Quality of Service (QoS) requirements before, then the field of a required bandwidth (RB) 8D stores a required bandwidth included in the exchanged frame. It should be noted here that in Embodiment 2, the value stored in RB 8D is not particularly used, either.

In Embodiment 2, NTR 8b stores therein a total number of MAC addresses of transmission stations (surrounding terminals) of signals that have arrived at the own station (a total number of surrounding terminals). Predetermined pieces of information, such as 8-1, are each provided for a different one of the surrounding terminals. Each address 8A stores therein a corresponding one of the MAC addresses of the surrounding terminals, and each HTP 8B stores therein "0".

<Structure of Radio Station>

Figure 12:
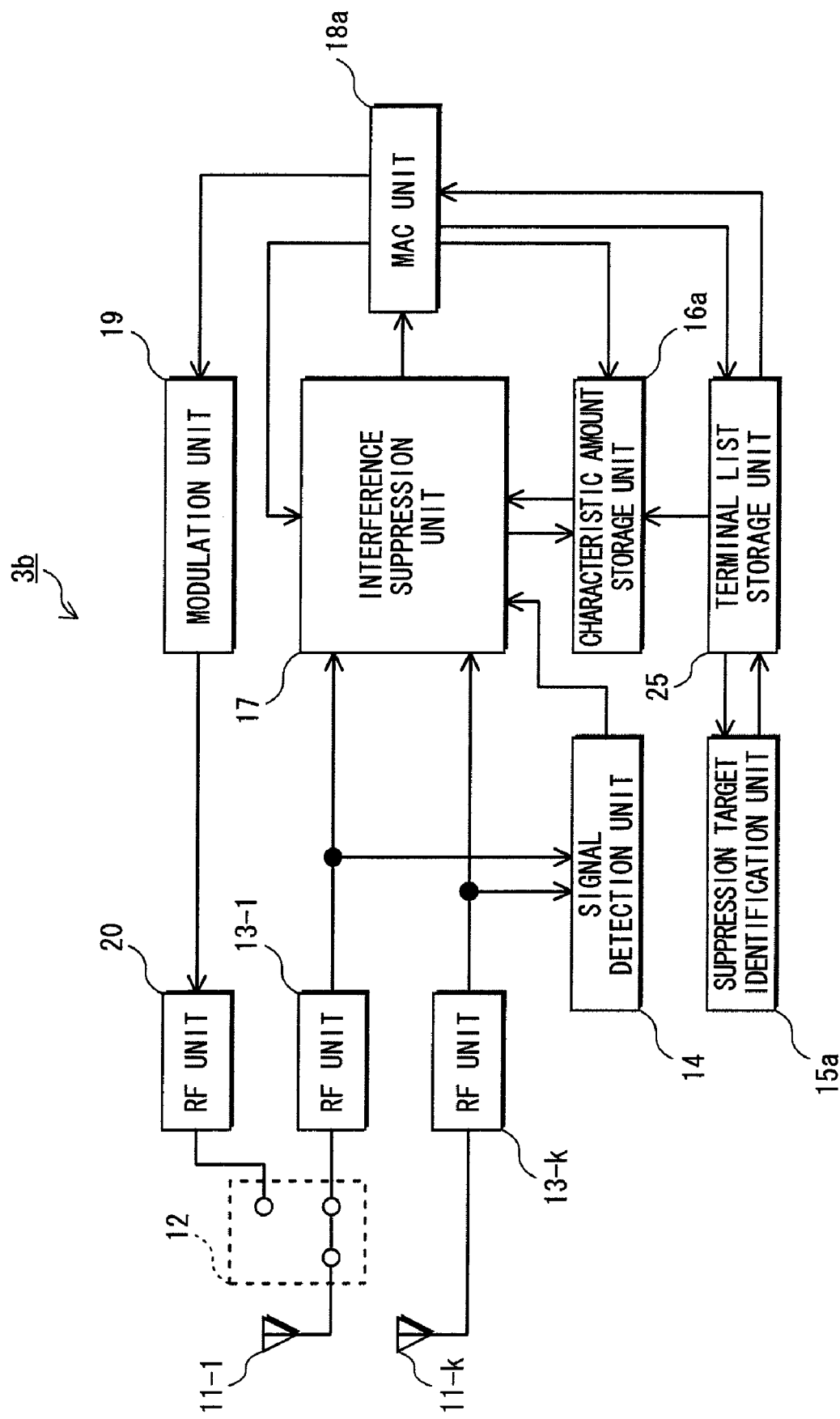
FIG. 12 shows the structure of each radio station shown in FIG. 10.

With reference to FIG. 12, the following describes the structure of the radio station (reception station) 3b illustrated in FIG. 10. FIG. 12 shows the structure of the radio station 3b. As other radio stations than the radio station 3b (e.g., the radio station 3a) have the same structure as the radio station 3b, descriptions thereof are omitted.

The radio station 3b is composed of a plurality of antennas 11-1 to 11-k, a switch circuit 12, RF units 13-1 to 13-k, a signal detection unit 14, a suppression target identification unit 15a, a terminal list storage unit 25, a characteristic amount storage unit 16a, an interference suppression unit 17, a MAC unit 18a, a modulation unit 19, and an RF unit 20.

The terminal list storage unit 25 stores therein a terminal list management table, one example of which is illustrated in FIG. 13. The terminal list management table includes information sets each of which is composed of the following fields: "surrounding terminal address"; "surrounding terminal list"; "non-suppression target terminal list"; and "suppression target terminal list".

Each "surrounding terminal address" field stores a different one of MAC addresses of the own station and the surrounding terminals. The MAC addresses of the surrounding terminals, each of which is stored in the corresponding one of the "surrounding terminal address" fields, are source addresses included in MAC headers of signals that the own station have received before, i.e., MAC addresses of radio stations that have transmitted these signals.

Each "surrounding terminal list" field stores a source address included in a MAC header of a signal that the radio station indicated by the corresponding "surrounding terminal address" field has received before. Here, in a case where the radio station indicated by the corresponding "surrounding terminal address" field has received a plurality of signals transmitted by a plurality of radio stations, a plurality of MAC addresses are stored in each "surrounding terminal list" field.

Each "non-suppression target terminal list" field stores a MAC address of a radio station that, when the own station performs radio communication with a radio station indicated by the corresponding "surrounding terminal address" field and receives a desired signal therefrom, has no possibility of transmitting an interfering signal that would be superimposed on the received desired signal. It should be noted here that there may be a case where a plurality of MAC addresses are stored in one "non-suppression target terminal list" field.

Each "suppression target terminal list" field stores a MAC address of a radio station that, when the own station performs radio communication with a radio station indicated by the corresponding "surrounding terminal address" field and receives a desired signal therefrom, has a possibility of transmitting an interfering signal that would be superimposed on the received desired signal. It should be noted here that there may be a case where a plurality of MAC addresses are stored in one "suppression target terminal list" field.

The terminal list storage unit 25 (i) selects, from the terminal list management table, an information set whose "surrounding terminal address" field stores a MAC address of a transmission station with which the own station is performing communication with, and (ii) outputs, to the characteristic amount storage unit 16a, a suppression target terminal list showing one or more MAC addresses stored in the "suppression target terminal list" field of the selected information set.

The suppression target identification unit 15a updates content of the "non-suppression target terminal list" field and content of the "suppression target terminal list" field of each information set included in the terminal list management table, excluding one information set whose "surrounding terminal address" field stores the MAC address of the own station. This update is performed based on (i) content of the "surrounding terminal list" field of said each information set excluding the one information set (i.e., a second surrounding terminal list), and (ii) content of the "surrounding terminal list" field of the excluded one information set (i.e., a first surrounding terminal list).

The suppression target identification unit 15a updates the content of the "non-suppression target terminal list" field of said each information set, excluding the one information set, to a surrounding terminal address listed in both of the first and second terminal lists. The suppression target identification unit 15a also updates the content of the "suppression target terminal list" field of said each information set, excluding the one information set, to a surrounding terminal address that satisfies the following conditions: (i) listed in the first terminal list; (ii) does not match the surrounding terminal address of its own information set; and (iii) not listed in the second terminal list.

The following describes an example of processing performed by the suppression target identification unit 15a, based on the information set to be updated whose "surrounding terminal address" field stores "S".

The suppression target identification unit 15a reads out (i) the first surrounding terminal list "S, A, B, C" from the "surrounding terminal list" field of the information set whose "surrounding terminal address" field stores "R (OWN STATION)" and (ii) the second surrounding terminal list "R, C" from the "surrounding terminal list" field of the information set to be updated.

The suppression target identification unit 15a updates the content stored in the "non-suppression target terminal list" field of the information set to be updated to "C", which is the surrounding terminal address that is listed in both of the first surrounding terminal list ("S, A, B, C") and the second surrounding terminal list ("R, C").

The suppression target identification unit 15a updates the content stored in the "suppression target terminal list" field of the information set to be updated to "A, B", which are the surrounding terminal addresses that each satisfy the following conditions: (i) listed in the first terminal list ("S, A, B, C"); (ii) does not match the surrounding terminal address of the information set to be updated ("S"); and (iii) not listed in the second terminal list ("R, C").

The characteristic amount storage unit 16a is storage for storing therein, for each surrounding terminal that has transmitted a signal before to the own station, a characteristic amount of an interfering signal. The characteristic amount storage unit 16a outputs, to the interference suppression unit 17, a characteristic amount of an interfering signal pertaining to one of the radio stations listed in the suppression target terminal list which is input by the terminal list storage unit 25.

The characteristic amount storage unit 16a stores therein a characteristic amount management table one example of which is illustrated in FIG. 14. The characteristic amount management table is composed of information sets each of which includes a "surrounding terminal address" field and a "characteristic amount" field. The "characteristic amount" field further includes the following subfields: "subband 1", "subband 2", "subband3", "subband 4" and "subband5".

Each "surrounding terminal address" field stores a different one of the MAC addresses of the surrounding terminals. Note, these MAC addresses of the surrounding terminals, which are stored in the "surrounding terminal address" fields, are source addresses included in MAC headers of signals that the own station has received before.

The subfields (e.g., "subband 1") of the "characteristic amount" field each store a characteristic amount of a subband of an interfering signal relating to a corresponding radio station, the characteristic amount being measured by the interference suppression unit 17.

For example, in a case where the own station is performing radio communication with a radio station whose surrounding terminal address is "S", the terminal list storage unit 25 inputs, to the characteristic amount storage unit 16a, the suppression target terminal list "A, B". The characteristic amount storage unit 16a selects one of "A" and "B" from the suppression target terminal list, and outputs a characteristic amount corresponding to the selected surrounding terminal address to the interference suppression unit 17.

The MAC unit 18a reads out a PHY header and a MAC header from demodulated data, and outputs a source address included in the MAC header to the characteristic amount storage unit 16a and the terminal list storage unit 25.

The MAC unit 18a controls the operation mode of the interference suppression unit 17 by outputting, to the interference suppression unit 17, control signals for instructing the interference suppression unit 17 to switch between two different operation modes.

Upon judging that the destination address included in the MAC header of the modulated data that has been input by the interference suppression unit 17 matches the MAC address of the own station, the MAC unit 18a outputs a control signal that instructs the interference suppression unit 17 to switch to an "interference suppression mode". Then, once the interference suppression unit 17 finishes inputting, to the MAC unit 18a, the demodulated data whose MAC header includes the destination address that matches the MAC address of the own station, the MAC unit 18a outputs a control signal that instructs the interference suppression unit 17 to switch to the "interference measurement mode".

The MAC unit 18a performs processing for acquiring a second surrounding terminal list from each radio station, including the radio station with which the own station is performing radio communication, and then outputs the acquired second surrounding terminal list to the terminal list storage unit 25.

<Interference Measurement Processing and Interference Suppression Processing>

Figure 15:
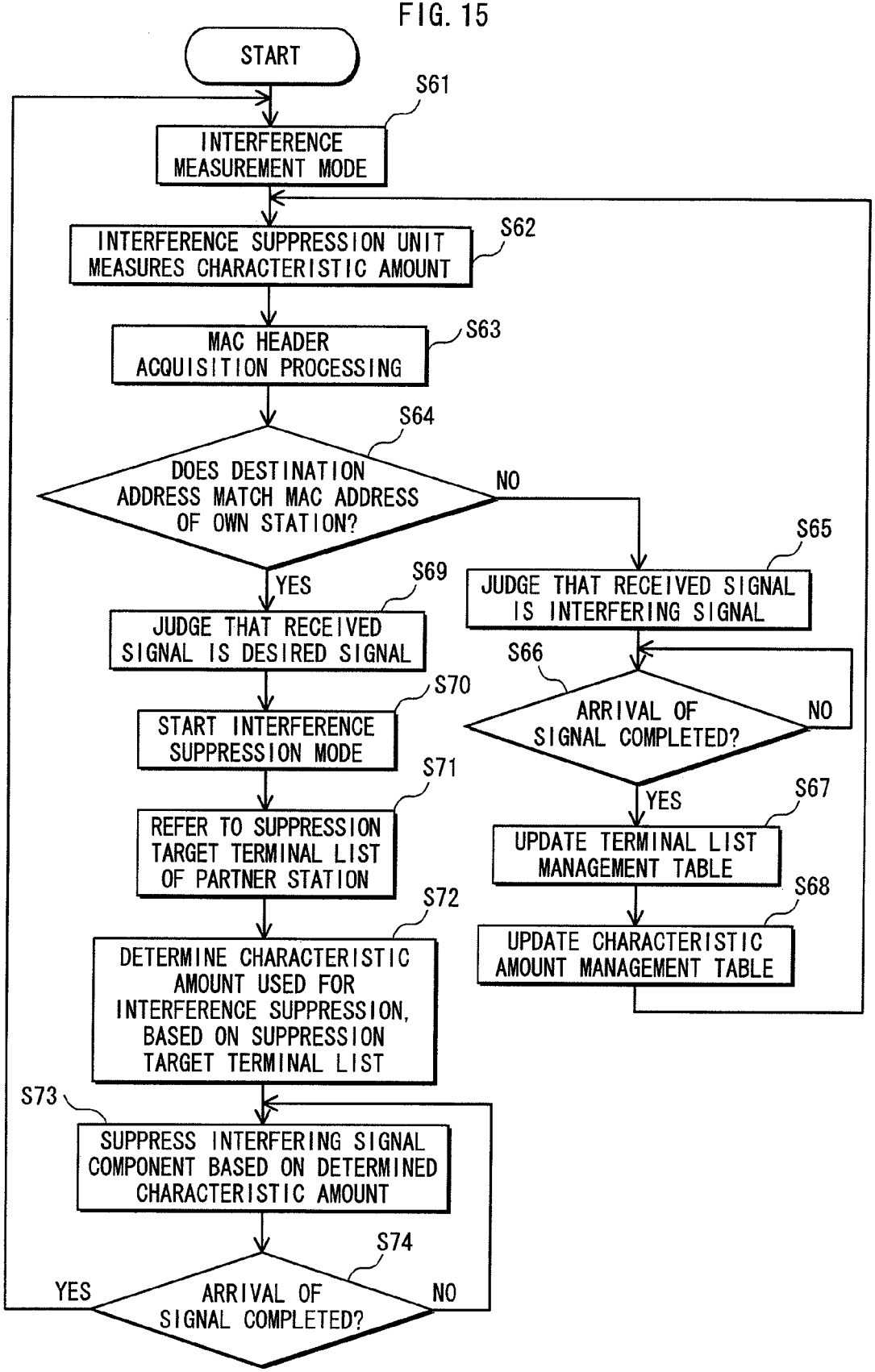
FIG. 15 is a flowchart of interference measurement processing and interference suppression processing performed by the radio station shown in FIG. 12.

With reference to FIG. 15, the following describes the interference measurement processing and the interference suppression processing performed by the radio station (reception station) 3b of FIG. 12. FIG. 15 is a flowchart of the interference measurement processing and the interference suppression processing performed by the radio station 3b of FIG. 12. It should be noted here that other stations, such as the station with which the radio station 3b is performing radio communication (i.e., the transmission station 3a), performs this processing in the same procedure.

The MAC unit 18a performs control for setting the operation mode of the interference suppression unit 17 to the "interference measurement mode" (Step S61). Once the operation mode of the interference suppression unit 17 is set to the "interference measurement mode", the interference suppression unit 17 (i) measures a characteristic amount of a baseband signal input by the RF unit (13-1 to 13-k), (ii) demodulates the baseband signal, and (iii) outputs demodulated data to the MAC unit 18a (Step S62).

The MAC unit 18a acquires a PHY header and a MAC header from the demodulated data input by the interference suppression unit 17 (Step S63).

The MAC unit 18a compares a destination address included in the acquired MAC header with the MAC address of the own station (Step S64).

When a result of the comparison shows that the destination address included in the acquired MAC header does not match the MAC address of the own station (the NO branch of Step S64), the MAC unit 18a judges that the currently received signal is an interfering signal, and outputs the source address included in the MAC header to the terminal list storage unit 25 (Step S65).

The MAC unit 18a judges whether or not the arrival of the currently received signal is completed, based on data lengths included in the modulated data (Step S66).

When the currently received signal is continuously arriving (the NO branch of Step S66), the MAC unit 18a continues the processing of Step S66.

When the arrival of the currently received signal is completed (the YES branch of Step S66), the terminal list storage unit 25 generates a new information set in the terminal list management table and registers the source address input by the MAC unit 18a in a "surrounding terminal address" field of the new information set, if the source address has not been registered yet. Also, when the source address input by the MAC unit 18a is not stored in the "surrounding terminal list" field of the information set whose "surrounding terminal address" field stores the MAC address of the own station, the terminal list storage unit 25 also adds this source address to the stated "surrounding terminal list" field (Step S67).

When the characteristic amount management table stores an information set whose "surrounding terminal address" field stores the source address input by the MAC unit 18a, the characteristic amount storage unit 16a updates content stored in a corresponding one of the subfields included in the "characteristic amount" field of this information set to the characteristic amount input by the interference measurement unit 17. When the characteristic amount management table does not store such an information set, the characteristic amount storage unit 16a generates a new information set in the characteristic amount management table and registers (i) the source address input by the MAC unit 18a in its "surrounding terminal address" field and (ii) the characteristic amount input by the interference suppression unit 17 in the corresponding subfield included in its "characteristic amount" field (Step S68).

When the result of the comparison performed in Step S64 shows that the destination address included in the acquired MAC header matches the MAC address of the own station (the YES branch of Step S64), the MAC unit 18a judges that the currently received signal is a desired signal (Step S69).

The MAC unit 18a performs control for switching the operation mode of the interference suppression unit 17 to the "interference suppression mode". Accordingly, the operation mode of the interference suppression unit 17 is switched from the "interference measurement mode" to the "interference suppression mode" (Step S70).

The terminal list storage unit 25 searches the terminal list management table for the information set whose "surrounding terminal address" field stores the source address input by the MAC unit 18a. The terminal list storage unit 25 then outputs, to the characteristic amount storage unit 16a, the suppression target terminal list stored in the "suppression target terminal list" field of the searched information set (Step S71).

The characteristic amount storage unit 16a selects one of the MAC addresses listed in the suppression target terminal list input by the terminal list storage unit 25. Then, the characteristic amount storage unit 16a searches the characteristic amount management table for the information set whose "surrounding terminal address" field stores the selected MAC address, and outputs, to the interference suppression unit 17, the characteristic amount stored in the corresponding subfield included in the "characteristic amount" field of the searched information set (Step S72).

The interference suppression unit 17 suppresses the interfering signal from the baseband signal input by the RF unit (13-1 to 13-k), based on the characteristic amount input by the characteristic amount storage unit 16a. Then, the interference suppression unit 17 demodulates the signal, the interfering signal of which has been suppressed, and outputs demodulated data to the MAC unit 18a (Step S73).

The MAC unit 18a judges whether or not the arrival of the currently received signal is completed, based on the data lengths included in the demodulated data (Step S74).

When the currently received signal is continuously arriving (the NO branch of Step S74), the own station returns to the processing of Step S73; consequently, the interference suppression unit 17 continues to perform the processing for suppressing an interfering signal from the baseband signal, or the like.

When the arrival of the currently received signal is completed (the YES branch of Step S74), the own station returns to the processing of Step S61. Consequently, the MAC unit 18a performs control for switching the operation mode of the interference suppression unit 17 to the "interference measurement mode", and the interference suppression unit 17 starts operating in the "interference measurement mode".

<Suppression Target Identification Processing>

Figure 16:
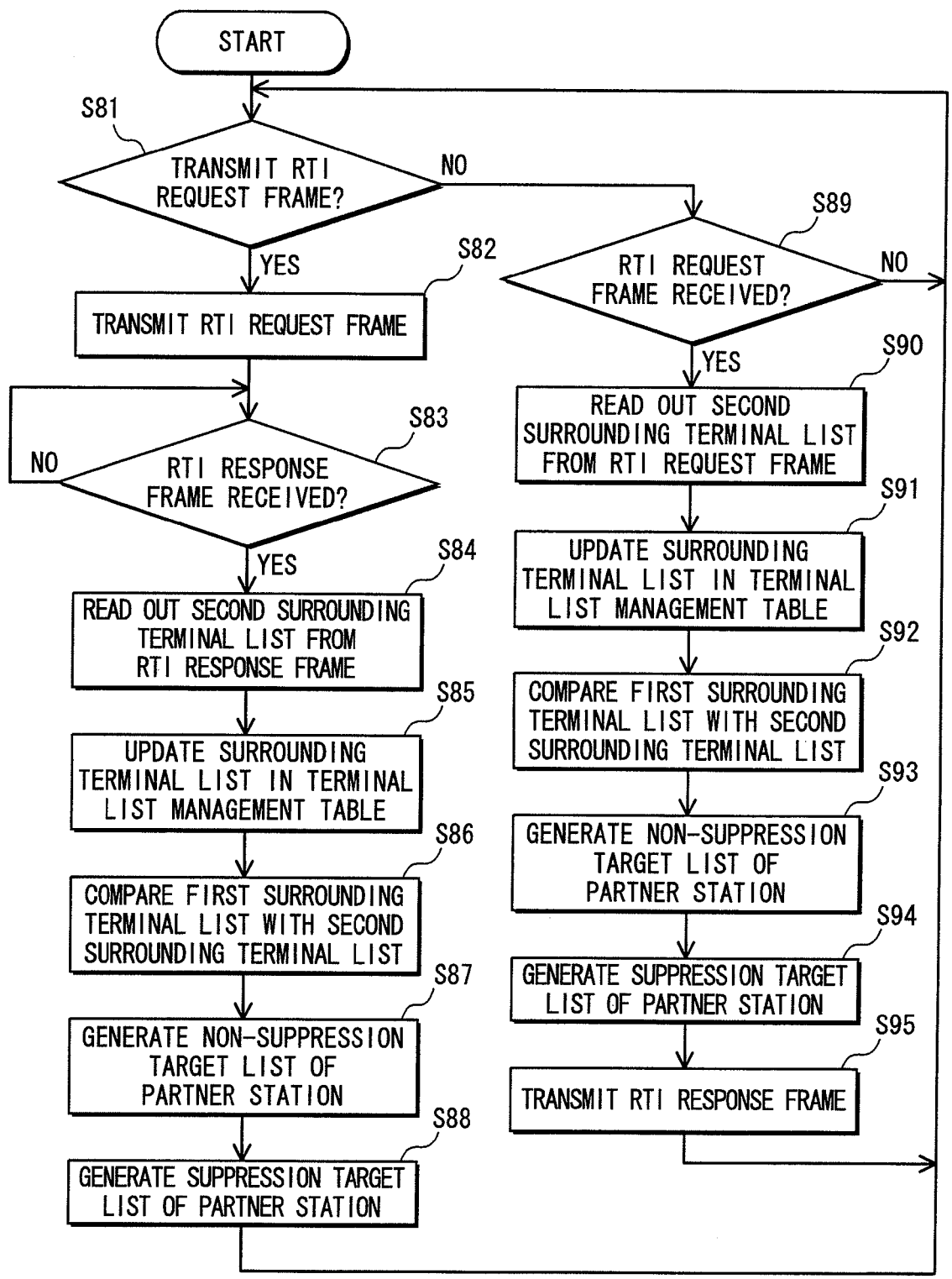
FIG. 16 is a flowchart of suppression target identification processing performed by the radio station shown in FIG. 12.

With reference to FIG. 16, the following describes the suppression target identification processing performed by the radio station (reception station) 3b of FIG. 12. FIG. 16 is a flowchart of the suppression target identification processing performed by the radio station 3b. It should be noted here that other stations, such as a partner station with which the radio station 3b is performing radio communication (i.e., the transmission station 3a), performs this processing in the same procedure.

As the MAC unit 18a transmits an RTI request frame every predetermined unit of time, it monitors elapsed time so as to judge whether or not it should transmit the RTI request frame (Step S81).

Once the MAC unit 18a determines to transmit the RTI request frame (the YES branch of Step S81), it refers to the terminal list management table stored in the terminal list storage unit 25, and reads out the surrounding terminal list (the first surrounding terminal list) from the "surrounding terminal list" field of the information set whose "surrounding terminal address" field stores the MAC address of the own station. Then, the MAC unit 18a generates an RTI request frame that includes the first surrounding terminal list. The generated RTI request frame is transmitted as a radio-frequency signal via the RF unit 20, the switch circuit 12 and the antenna 11-1 (Step S82).

The MAC unit 18a judges whether or not the own station has received, from the partner station, an RTI response frame in response to the RTI request frame which has been transmitted in Step S82 (Step S83). The MAC unit 18a keeps monitoring whether or not it has received the RTI response frame from the partner station, until it actually receives one (the NO branch of Step S83). The RTI response frame includes the second surrounding terminal list of the partner station. The second surrounding terminal list is the surrounding terminal list stored in the "surrounding terminal list" field of the information set whose "surrounding terminal address" field stores the MAC address of the partner station, the information set being included in the terminal list management table stored in the terminal list storage unit 25 of the partner station.

Upon receiving the RTI response frame (the YES branch of Step S83), the MAC unit 18a reads out the second surrounding terminal list from the RTI response frame (Step S84).

The MAC unit 18a outputs the read second surrounding terminal list to the terminal list storage unit 25. The terminal list storage unit 25 (i) selects, from the terminal list management table, the information set whose "surrounding terminal address" field stores the MAC address of the partner station, and (ii) updates the content stored in the "surrounding terminal list" field of the selected information set to the second surrounding terminal list (Step S85).

The terminal list storage unit 25 outputs, to the suppression target identification unit 15a, (i) the first surrounding terminal list stored in the terminal list management table and (ii) the second surrounding terminal list input by the MAC unit 18a.

The suppression target identification unit 15a compares the first surrounding terminal list with the second surrounding terminal list (Step S86).

The suppression target identification unit 15a generates, based on a result of the comparison, a non-suppression target terminal list of the partner station, then outputs this non-suppression target terminal list to the terminal list storage unit 25. The terminal list storage unit 25 (i) selects, from the terminal list management table, the information set whose "surrounding terminal address" field stores the MAC address of the partner station and (ii) updates the content stored in the "non-suppression target terminal list" field of the selected information set to the non-suppression target terminal list input by the suppression target identification unit 15a (Step S87).

The suppression target identification unit 15a also generates, based on the result of the comparison, a suppression target terminal list of the partner station, then outputs this suppression target terminal list to the terminal list storage unit 25. The terminal list storage unit 25 (i) selects, from the terminal list management table, the information set whose "surrounding terminal address" field stores the MAC address of the partner station and (ii) updates the content stored in the "suppression target terminal list" field of the selected information set to the suppression target terminal list input by the suppression target identification unit 15a (Step S88).

Then, the own station returns to the processing of Step S81.

Once the MAC unit 18a judges in the judging step of Step S81 that it is not going to transmit the RTI request frame (the NO branch of Step S81), the MAC unit 18a judges whether or not is has received an RTI request frame from the partner station (Step S89). When it has not received the RTI request frame (the NO branch of Step S89), the own station returns to the processing of Step S81.

Upon receiving the RTI request frame (the YES branch of Step S89), the MAC unit 18a reads out a second surrounding terminal list from the RTI request frame (Step S90).

The MAC unit 18a outputs the read second surrounding terminal list to the terminal list storage unit 25. The terminal list storage unit 25 (i) selects, from the terminal list management table, the information set whose "surrounding terminal address" field stores the MAC address of the partner station, and (ii) updates the content stored in the "surrounding terminal list" field of the selected information set to the content of the second surrounding terminal list (Step S91).

The terminal list storage unit 25 outputs, to the suppression target identification unit 15a, (i) the first surrounding terminal list included in the terminal list management table and (ii) the second surrounding terminal list input by the MAC unit 18a. The suppression target identification unit 15a compares the first surrounding terminal list with the second surrounding terminal list (Step S92).

The suppression target identification unit 15a generates, based on a result of the comparison, a non-suppression target terminal list of the partner station, and outputs this non-suppression target terminal list to the terminal list storage unit 25. The terminal list storage unit 25 (i) selects, from the terminal list management table, the information set whose "surrounding terminal address" field stores the MAC address of the partner station, and (ii) updates the content stored in the "non-suppression target terminal list" field of the selected information set to the non-suppression target terminal list input by the suppression target identification unit 15a (Step S93).

The suppression target identification unit 15a also generates, based on the result of the comparison, a suppression target terminal list of the partner station, and outputs this suppression target terminal list to the terminal list storage unit 25. The terminal list storage unit 25 (i) selects, from the terminal list management table, the information set whose "surrounding terminal address" field stores the MAC address of the partner station, and (ii) updates the content stored in the "suppression target terminal list" field of the selected information set to the suppression target terminal list input by the suppression target identification unit 15a (Step S94).

Referring to the terminal list management table stored in the terminal list storage unit 25, the MAC unit 18a reads out the first surrounding terminal list from the "surrounding terminal list" field of the information set whose "surrounding terminal address" field stores the MAC address of the own station. Then, the MAC unit 18a generates an RTI response frame that includes the first surrounding terminal list. The generated RTI response frame is transmitted as a radio-frequency signal via the RF unit 20, the switch circuit 12 and the antenna 11-1 (Step S95).

Then, the own station returns to the processing of Step S81.

Figure 17A:
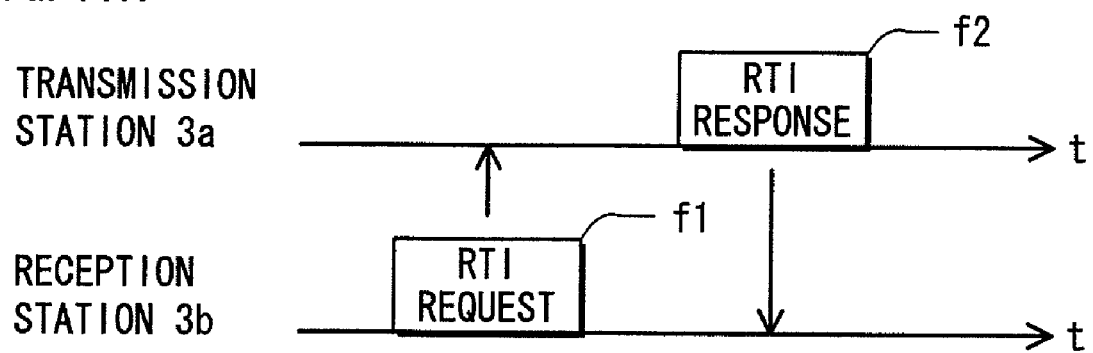
FIGS. 17A and 17B show exemplary procedures for each radio station of FIG. 10 to exchange a surrounding terminal list with another radio station.

Note, in a case of FIG. 17A, the reception station 3b transmits, to the transmission station 3a, an RTI request frame f1 that includes the content of the first surrounding terminal list. In response, the transmission station 3a transmits, to the reception station 3b, an RTI response frame f2 that includes the content of the second surrounding terminal list. In this case, the reception station 3b performs processing of Steps S81 to S88.

Figure 17B:
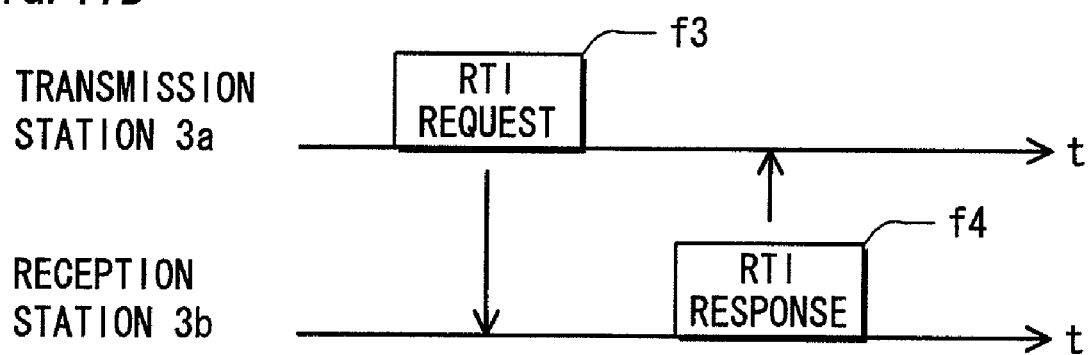

In a case of FIG. 17B, the transmission station 3a transmits, to the reception station 3b, an RTI request frame f3 that includes the content of the second surrounding terminal list. In response, the reception terminal 3b transmits, to the transmission station 3a, an RTI response frame f4 that includes the content of the first surrounding terminal list. In this case, the reception station 3b performs processing of Step S81 and Steps S89 to S95.

<Reception Processing to be Performed when Measuring Characteristic Amount>

Figure 18:
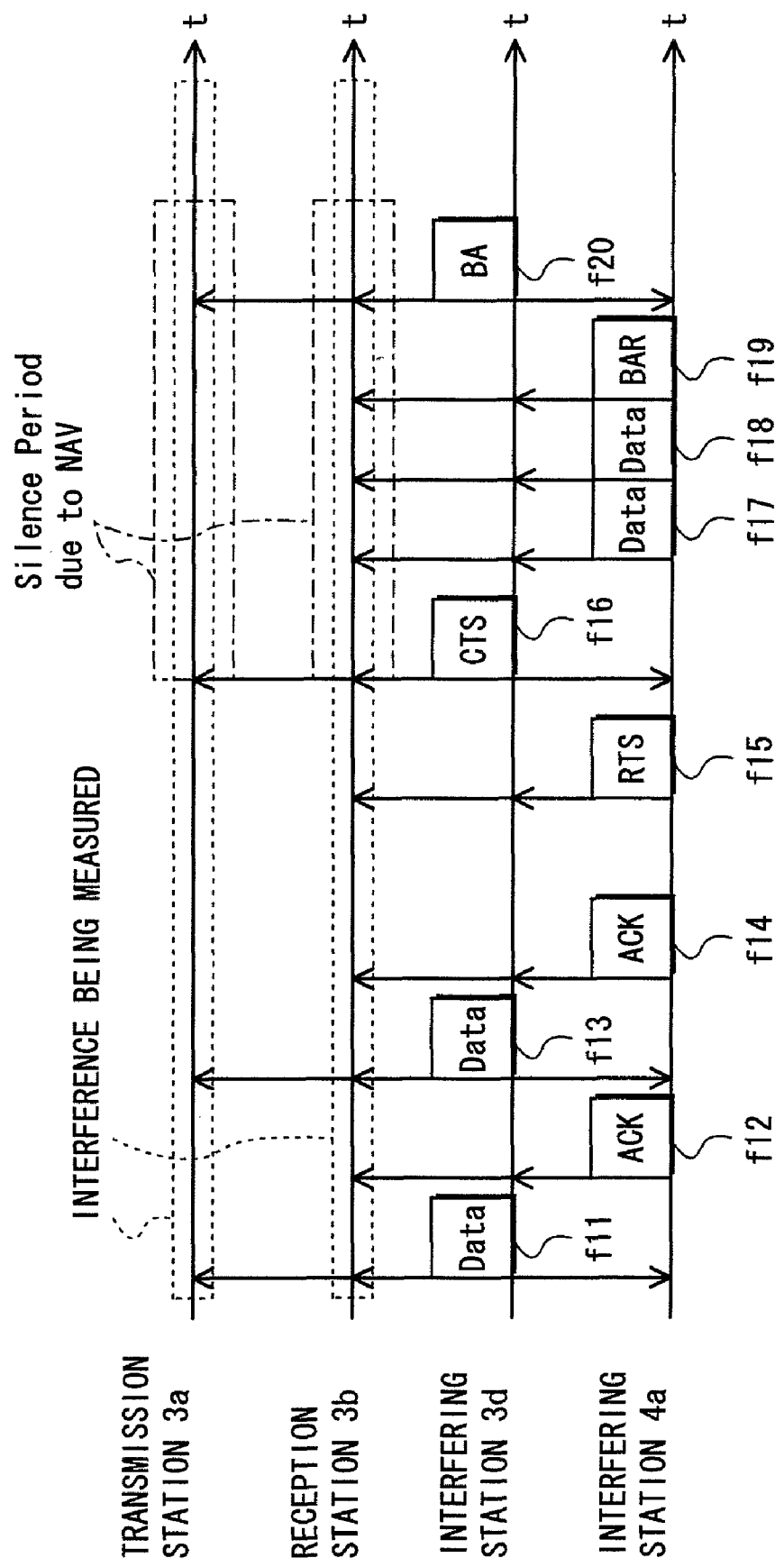
FIG. 18 shows an example of reception processing performed by the radio stations shown in FIG. 10 when measuring a characteristic amount.

With reference to FIG. 18, the following describes an example of reception processing that is performed by the radio station (reception station) 3b when measuring a characteristic amount, the radio station 3b being of the radio communication system illustrated in FIG. 10. FIG. 18 shows an example of the reception processing performed by the radio station 3b of FIG. 10 when measuring a characteristic amount.

It is assumed that in FIG. 18, the radio station (transmission station) 3a is performing radio communication with the radio station (reception station) 3b, and the radio station (interfering station) 3d is performing radio communication with the radio station (interfering station) 4a.

It is also assumed that MAC addresses of the radio stations 3a, 3b, 3d and 4a are "3a", "3b", "3d" and "4a", respectively. It is assumed that the radio station 3a is located within a radio arrival area of the radio station 3d, but is located outside a radio arrival area of the radio station 4a. It is assumed that the radio station 3b is located within radio arrival areas of the radio stations 3d and 4a.

The interfering station 3d transmits a data frame f11 that includes "3d" as a source address and "4a" as a destination address. Since the transmission station 3a and the reception station 3b are located within the radio arrival area of the interfering station 3d, each of the transmission station 3a and the reception station 3b receives the data frame f11, updates the content stored in its terminal list storage unit 25 based on the source address included in the data frame f11, and measures a characteristic amount of the interfering signal based on the data frame f11.

The interfering station 4a transmits an ACK frame f12 that includes "3d" as a destination address. Here, the reception station 3b is located within the radio arrival area of the interfering station 4a, but the transmission station 3a is located outside the radio arrival area of the interfering station 4a. Therefore, other than the interfering station 3d, only the reception station 3b receives the ACK frame f12.

The same processing will be performed with respect to a data frame f13 and an ACK frame f14.

The interfering station 4a transmits a Request to Send (RTS) frame f15 that includes "4a" as a source address and "3d" as a destination address. Here, the reception station 3b is located within the radio arrival area of the interfering station 4a, but the transmission station 3a is located outside the radio arrival area of the interfering station 4a. Therefore, other than the interfering station 3d, only the reception station 3b receives the RTS frame f15, updates the content stored in its terminal list storage unit 25 based on the source address included in the RTS frame f15, and measures a characteristic amount of the interfering signal based on the RTS frame f15.

The interfering station 3d transmits a Clear to Send (CTS) frame f16 that includes "4a" as a destination address. Here, the transmission station 3a and the reception station 3b are located within the radio arrival area of the interfering station 3d. Therefore, the transmission station 3a and the reception station 3b both receive the CTS frame f16, and prohibit themselves from performing transmission during a period that is determined by Network Allocation Vector (NAV) information included in the CTS frame f16.

The interfering station 4a transmits data frames f17 and f18 that each include "4a" as a source address and "3d" as a destination address. The interfering station 4a also transmits a block ACK request (BAR) frame f19 that includes "4a" as a source address and "3d" as a destination address. Here, the reception station 3b is located within the radio arrival area of the interfering station 4a, but the transmission station 3a is located outside the radio arrival area of the interfering station 4a. Therefore, other than the interfering station 3d, only the reception station 3b receives the data frames f17 and f18 and the BAR frame f19, updates the content stored in its terminal list storage unit 25, and measures a characteristic amount of the interfering signal.

The interfering station 3d transmits a block ACK (BA) frame f20 as confirmation of the reception of the BAR frame f19, the BA frame f20 including "4a" as a destination address. Other than the interfering station 4a, the transmission station 3a and the reception station 3b also receive this BA frame f20.

<Reception Processing to be Performed when Suppressing Interfering Signal>

Figure 19:
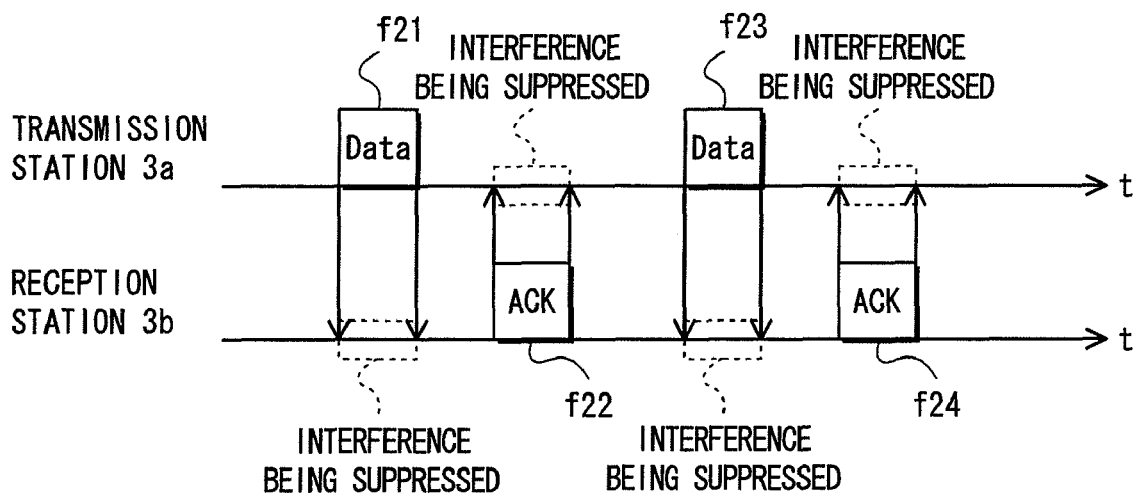
FIG. 19 shows an example of reception processing performed by the radio stations shown in FIG. 10 when suppressing the interference.

With reference to FIG. 19, the following describes an example of reception processing performed by the radio station (reception station) 3b when suppressing an interfering signal, the radio station 3b being of the radio communication system illustrated in FIG. 10. FIG. 19 shows an example of reception processing performed by the radio station 3b of FIG. 10 when suppressing an interfering signal.

It is assumed that in FIG. 19, the radio station (transmission station) 3a is performing radio communication with the radio station (reception station) 3b. It is also assumed that MAC addresses of the radio stations 3a and 3b are "3a" and "3b", respectively.

The transmission station 3a transmits a data frame f21 that includes "3a" as a source address and "3b" as a destination address. Accordingly, the reception station 3b receives the data frame f21. As the destination address "3b" is the MAC address of the reception station 3b, the reception station 3b switches its operation mode from the "interference measurement mode" to the "interference suppression mode", and performs processing for suppressing an interfering signal component from the data frame f21. Upon completion of the arrival of the data frame 21, the reception station 3b switches its operation mode from the "interference suppression mode" to the "interference measurement mode".

The reception station 3b transmits an ACK frame f22 that includes "3a" as a destination address. Accordingly, the transmission station 3a receives the ACK frame f22. As the destination address "3a" is the MAC address of the transmission station 3a, the transmission station 3a switches its operation mode from the "interference measurement mode" to the "interference suppression mode", and performs processing for suppression an interfering signal component from the ACK frame f22. Upon completion of the arrival of the ACK frame f22, the transmission station 3a switches its operation mode from the "interference suppression mode" to the "interference measurement mode".

The same processing will be performed with respect to a data frame f23 and an ACK frame f24.

<<Additional Remarks>>

The present invention is not limited to the above Embodiments. For example, the following variations are also included in the present invention.

(1) It is illustrated in the above Embodiments that one characteristic amount of a signal is used to suppress the interference. This, however, is not a limitation of the present invention.

For example, when more characteristic amounts of signals are used to suppress the interference, the interfering signal can be suppressed from a received signal in a more effective manner. However, the larger the number of the provided antennas is, the larger becomes the processing circuit for measuring characteristic amounts of signals and suppressing interfering signals. This leads to a cost increase. It is hence desirable that the number of characteristic amounts of signals that are used to suppress the interference be determined depending on the capability to suppress interfering signals and on cost.

Note, any method may be employed to select, from among characteristic amounts of signals associated with suppression target transmission sources, a characteristic amount of a signal that is used for the interference suppression. For example, it is permissible to select a characteristic amount of a signal that has been measured most recently.

(2) Each radio station described in the above Embodiment 1 may additionally have a function of judging a transmission source of a signal that arrives at each radio station during the interference measurement prohibition period as a non-suppression target transmission source. Note, the interference measurement prohibition period denotes a period throughout which there is a possibility of receiving a desired signal from a partner station (i.e., a radio station with which the own station is performing radio communication).

In this case, for example, it is necessary to insert, between the NO branch of Step S37 ("PREAMBLE DETECTED?") and Step S33 ("JUDGE THAT RECEIVED SIGNAL IS SUPPRESSION TARGET SIGNAL"), a step for judging whether or not a signal arrives at a reception station during the interference measurement prohibition period. When the signal arrives during the interference measurement prohibition period, the reception station judges the signal as a non-suppression target signal and does not store a measured characteristic amount of the signal. On the other hand, when the signal arrives any time other than during the interference measurement prohibition period, the reception station proceeds to perform the processing of Step S33. This makes it possible to deter the reception station from suppressing interfering signals from a received signal by using a characteristic amount of a desired signal that the reception station receives during the interference measurement prohibition period.

For example, in HCCA, a reception station transmits a QoS CF-Poll frame to a transmission station. Here, the QoS CF-Poll frame stores therein (i) a MAC address of the transmission station to which the reception station grants a permission to perform transmission and (ii) a period during which the transmission station, which has been granted the stated permission, can transmit a radio packet signal (hereafter, "transmission permission period").

Upon receiving the QoS CF-Poll frame from the reception station, the transmission station acknowledges, with reference to content of the QoS CF-Poll frame, that it has been granted the transmission permission. After the receiving of the QoS CF-Poll is completed, the transmission station starts transmitting a data frame at a time Ta, which is when SIFS has elapsed since the receiving of the QoS CF-Poll frame was completed. Then, the transmission station completes the transmitting of the data frame at a time Tb, which is when the transmission permission period has elapsed since the time Ta, at the latest.

Upon receiving the data frame, the reception station transmits an ACK frame to the transmission station when SIFS has elapsed since the receiving of the data frame was completed, the ACK frame notifying the transmission station of confirmation of the reception of the data frame.

In this case, once the reception station transmits the QoS CF-Poll frame, it sets a period between the time Ta and the time Tb as the interference measurement prohibition period.

Other than the above case, the following example may also be implemented. A reception station transmits a data frame to a transmission station. Upon receiving the data frame, the transmission station starts transmitting an ACK frame to the reception station at a time TA, the ACK frame notifying the reception station of confirmation of the reception of the data frame, and the time TA being when SIFS has elapsed since the receiving of the data frame was completed. Then, the transmission station completes the transmitting of the ACK frame at a time TB.

In this case, once the reception station transmits the data frame, it sets a period between the time TA and the time TB as the interference measurement prohibition period.

(3) In each of the above Embodiments, the signal detection unit 14 detects an arrival of a signal by using a change in received powers of baseband signals and a change in a between-antenna correlation. Here, it is allowed to perform such detection by merely using one of these.

(4) In Embodiment 2, the reception unit transmits the RTI request frame every predetermined unit of time so as to acquire the second surrounding terminal list from the transmission station. However, the timing of transmitting the RTI request frame is not particularly limited; the reception station may transmit the RTI request frame when it receives a signal from a radio station from which it has never received a signal before, when a transmission error rate exceeds a predetermined value, and so on.

(5) In Embodiment 2, in order for the reception station to acquire the second surrounding terminal list from the transmission station, the RTI request frame and the RTI response frame are exchanged between the transmission station and the reception station. This, however, is not a limitation of the present invention.

Figure 20:
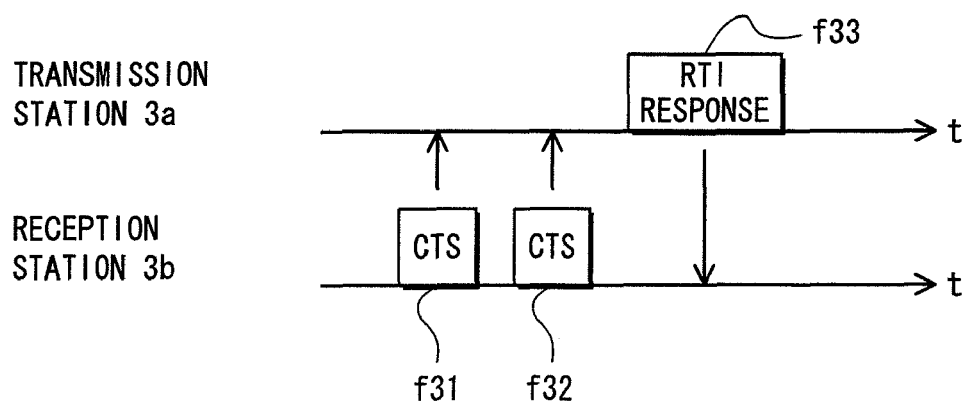
FIG. 20 is a diagram for explaining another procedure for the radio station shown in FIG. 12 to exchange the surrounding terminal list with another radio station.

For example, as exemplarily shown in FIG. 20, the following may be implemented. The reception station 3b transmits, in succession, Cleat to Send (CTS) frames f31 and f32 that each include the MAC address of the transmission station 3a as a destination address. Once the transmission station 3a receives, in succession, the CTS frames f31 and f32 that each include its own MAC address as the destination address, the transmission station 3a transmits an RTI response frame f33 that includes the content of the second surrounding terminal list.

In this case, neither the CTS frame f31 nor the CTS frame f32 includes the source address. Consequently, the RTI response frame f33 transmitted by the transmission station 3a does not include the destination address. When the reception station 3b receives the RTI response frame f33 between the transmission of the second CTS frame (i.e., f32) and a time when a predetermined time has elapsed since the transmission of the CTS frame f32, the reception station 3b judges that the received RTI response frame f33 is addressed to itself.

(6) In Embodiment 2, the radio station (reception station) 3b includes the terminal list management table (exemplarily shown in FIG. 13) in which information, such as the surrounding terminal list, is stored. Instead, the reception station 3b may include another type of terminal list management table (exemplarily shown in FIG. 21) in which such information is stored.

Referring to the terminal list management table which is exemplarily shown in FIG. 21, MAC addresses of the own station and recognizable terminals are each stored in a different one of "recognizable terminal address" fields. It should be noted here that each of the MAC addresses of the recognizable terminals that are stored in the "recognizable terminal address" fields is either a source address or a destination address included in a MAC header of a signal that the own station has received before; i.e., a MAC address of a radio station (transmission station or reception station) that has transmitted the signal.

Each "recognizable terminal list" field stores a source address and a destination address included in a MAC header of a signal that the radio station identified by the corresponding recognizable terminal address has received before.

Each "surrounding terminal list" field stores a source address included in a MAC header of a signal that the radio station identified by the corresponding recognizable terminal address has received before.

Each "hidden terminal list" field stores a MAC address of a hidden terminal. When the radio station identified by the corresponding recognizable terminal address bugs signals exchanged between surrounding radio stations, there may be a case where this radio station only receives a response request signal but cannot receive a response signal in acknowledgement of the response request signal. In this case, a destination address included in the response request signal is regarded as the MAC address of the hidden terminal.

Alternatively, each "hidden terminal list" field may simply store a MAC address that satisfies the following conditions: (i) listed in the corresponding "recognizable terminal list" field; and (ii) not listed in the corresponding "surrounding terminal list" field.

Each "non-suppression target terminal list" field stores a MAC address of a radio station that, when the own station performs radio communication with the radio station identified by the corresponding recognizable terminal address and receives a signal therefrom, has no possibility of transmitting an interfering signal that would be included in the received signal.

Each "suppression target terminal list" field stores a MAC address of a radio station that, when the own station performs radio communication with the radio station identified by the corresponding recognizable terminal address and receives a signal therefrom, has a possibility of transmitting an interfering signal that would be included in the received signal.

Figure 22:
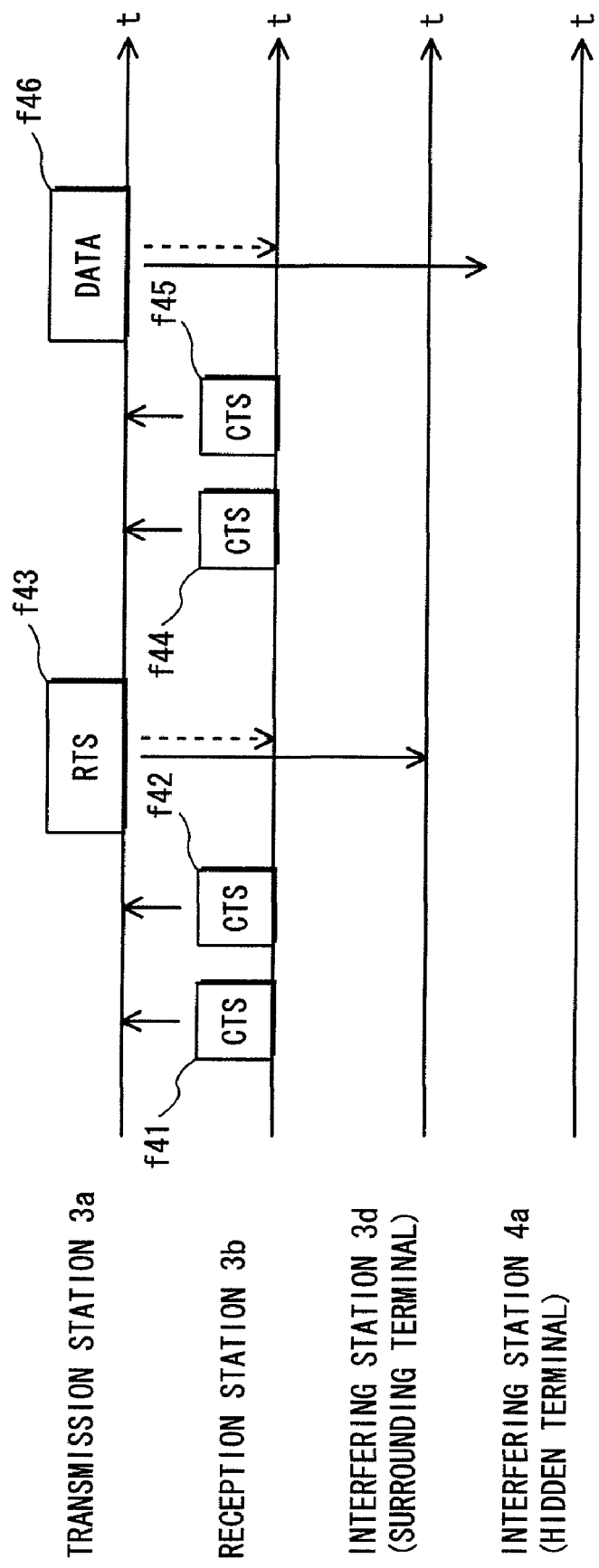
FIG. 22 is a diagram for explaining yet another procedure for the radio stations shown in FIG. 10 to exchange the surrounding terminal list with another radio station.

(7) As described above, in the case where each radio station stores therein the surrounding terminal list and the hidden terminal list that are associated with the own station, the reception station 3b can acquire the surrounding terminal list and the hidden terminal list associated with the transmission station 3a in, for example, a procedure illustrated in FIG. 22.

To the transmission station 3a, the interfering station 3d is its surrounding terminal and the interfering station 4a is its hidden terminal. It assumed here that MAC addresses of the transmission station 3a, the reception station 3b, the interfering station 3d and the interfering station 4a are "3a", "3b", "3d" and "4a", respectively.

The reception station 3b transmits, in succession, CTS frames f41 and f42 that each include "3a" as a destination address. Once the transmission station 3a receives, in succession, the CTS frames f41 and f42 that each include "3a" as a destination address, the transmission station 3a reads out, from the terminal list management table of FIG. 21 that is stored therein, the surrounding terminal list of its own. It should be noted here that the read surrounding terminal list includes "3d".

The transmission station 3a transmits an RTS frame f43 that includes "3a" as a source address and "3d", which is included in the read surrounding terminal list, as a destination address.

When the reception station 3b receives the RTS frame f43 between the transmission of the second CTS frame (i.e., f42) and a time when a predetermined time has elapsed since the transmission of the CTS frame f42, the reception station 3b judges the destination address included in this CTS frame f42 as a MAC address of its surrounding terminal.

The reception station 3b also transmits, in succession, CTS frames that each include "3a" as a destination address. Once the transmission station 3a receives, in succession, the CTS frames that each include "3a" as the destination address, the transmission station 3a reads out, from the terminal list management table of FIG. 21 that is stored therein, the hidden terminal list of its own. It should be noted here that the read hidden terminal list includes "4a".

The reception station 3b transmits an empty data frame f46 that includes "3a" as a source address and "4a", which is included in the read hidden terminal list, as a destination address. When the reception station 3b receives the data frame f46 between the transmission of the second CTS frame (i.e., f45) and a time when a predetermined time has elapsed since the transmission of the CTS frame f45, the reception station 3b judges the destination address included in this CTS frame f45 as a MAC address of its hidden terminal.

By repeating the transmitting of the two CTS frames in succession, the reception station 3b receives, from the transmission station 3a, the contents of the surrounding terminal list and the hidden terminal list of this transmission station 3a.

Figure 23:
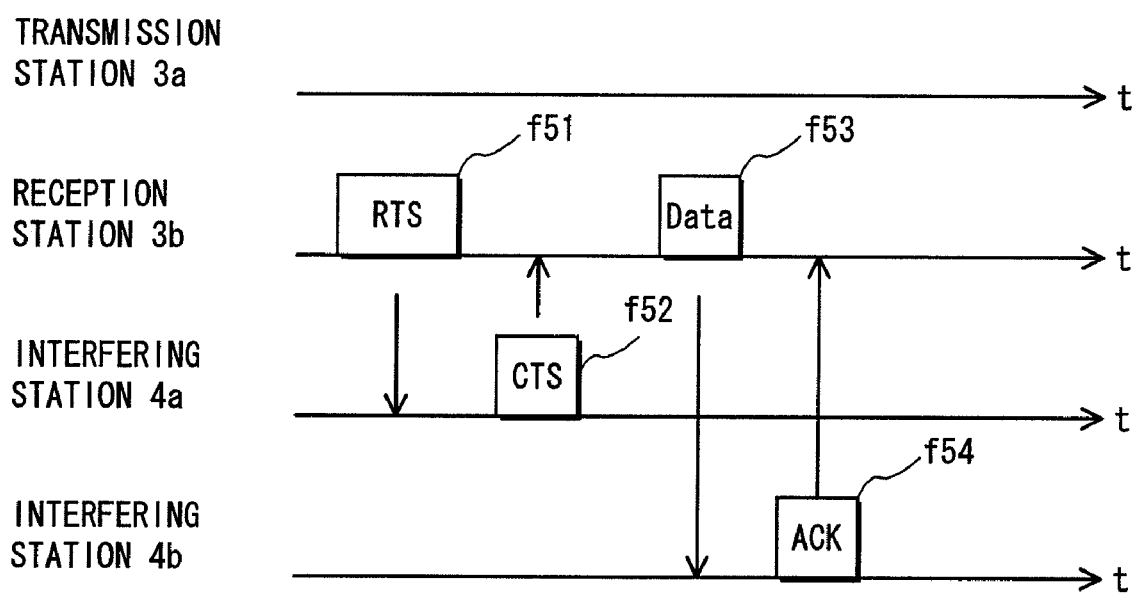
FIG. 23 shows another example of the reception processing performed by the radio stations shown in FIG. 10 when measuring the characteristic amount.

(8) According to Embodiment 2 described above, the radio station (reception station) 3b receives signals that are exchanged in the course of a radio communication between radio stations that are irrelevant to the reception station 3b, and the reception station 3b acquires, from these signals received, characteristic amounts thereof. This, however, is not a limitation of the present invention. For example, as shown in FIG. 23, the reception station 3b may estimate characteristic amounts of signals transmitted from the radio stations listed in the suppression target terminal list associated with the transmission station 3a.

It is assumed here that the reception station 3b has, in advance, acquired the second surrounding terminal list from the transmission station 3a by using the exchange procedure shown in FIG. 17, and generated the suppression terminal target list based on the first and second surrounding terminal lists. It is also assumed here that the MAC addresses of the interfering stations 4a and 4b are listed in the suppression target terminal list.

It is assumed that the MAC addresses of the transmission station 3a, the reception 3b, the interfering station 4a and the interfering station 4b are "3a", "3b", "4a" and "4b", respectively.

The reception station 3b transmits an RTS frame f51 that includes "3b" as a source address and "4a", which is listed in the suppression target terminal list, as a destination address. Once the interfering station 4a receives the RTS frame f51 including "4a" as the destination address, the interfering station 4a transmits a CTS frame f52 that includes "3b" as a destination address. Once the reception station 3b receives the CTS frame f52 including "3b" as the destination address, the reception station 3b estimates a characteristic amount of the signal based on the CTS frame f52. This way, the reception station 3b acquires the characteristic amount of the signal transmitted by the interfering station 4a.

The reception station 3b transmits a data frame f53 that includes "3b" ad a source address and "4b", which is listed in the suppression target terminal list, as a destination address. Once the interfering station 4b receives the data frame f53 including "4b" as the destination address, the interfering station 4b transmits an ACK frame f54 that includes "3b" as a destination address. Once the reception station 3b receives the ACK frame f54 that includes "3b" as the destination address, the reception station 3b estimates a characteristic amount of the signal based on the ACK frame f54. This way, the reception station 3b receives the characteristic amount of the signal transmitted by the interfering station 4b.

Alternatively, it is possible to exchange the surrounding terminal list and the hidden terminal list by exchanging the RTI request frame and the RTI response frame whose frame formats are shown in FIG. 11.

(9) Each Embodiment described above may be applied not only to a wireless LAN system using a carrier sense multiple access (CSMA) method, but also to a radio communication system using various access methods, such as a time division multiple access (TDMA) method, a frequency division multiple access (FDMA) method, a code division multiple access (CDMA) method, and a space division multiple access (SDMA) method.

(10) The structures of the above-described Embodiments may each be realized as a large scale integration (LSI) which is typically an integrated circuit. Here, each of these structures may be provided on a single chip. Alternatively, all or a portion of these structures may be provided on a single chip. LSI may be referred to as an integrated circuit (IC), a system LSI, a super LSI, or an ultra LSI, depending on the degree of integration.

The method used to realize the integrated circuit is not limited to LSI. The integrated circuit may be realized by a special-purpose circuit or a general-purpose processor. Moreover, a field programmable gate array (FPGA) that can be programmed after LSI manufacture, a reconfigurable processor in which it is possible to restructure settings and connections of circuit cells in LSI, or the like may be used.

Furthermore, if alternative technology for an integrated circuit is attained from the advancement in semiconductor technologies or from another technology derived from the semiconductor technologies and replaces LSI, then it is naturally allowed to incorporate this alternative technology into the integration of the functional blocks constituting the present invention as described above. For example, the application of biotechnology is a possibility.

Industrial Applicability

The present invention can be used in a reception station that suppresses, from a desired signal received, an interfering signal superimposed thereon, especially in a radio communication system in which radio packet signals are randomly transmitted, such as a CSMA method.

The invention claimed is:

1. An interference suppression method used in a reception station to suppress an interfering signal that has been superimposed on a desired signal, the desired signal being transmitted by a partner station with which the reception station is performing communication, the interference suppression method comprising steps of:

identifying a transmission source, from which the reception station received a signal, as either (i) a suppression target transmission source that has a possibility of transmitting the interfering signal superimposed on the desired signal, or (ii) a non-suppression target transmission source that does not have the possibility of transmitting the interfering signal superimposed on the desired signal;

acquiring, from the received signal, a characteristic amount of the received signal;

suppressing, when the reception station receives the desired signal, the interfering signal superimposed on the desired signal (i) with use of the characteristic amount of the received signal when the suppression target transmission source is identified as the transmission source of the received signal, and (ii) without use of the characteristic amount of the received signal when the non-suppression target transmission source is identified as the transmission source of the received signal;

generating a first surrounding terminal list showing a plurality of transmission source identifiers that indicate, in one-to-one correspondence, a plurality of transmission sources from which the reception station has received signals in the past; and obtaining, from the partner station, a second surrounding terminal list showing a plurality of transmission source identifiers that indicate, in one-to-one correspondence, a plurality of transmission sources from which the partner station has received signals in the past, wherein the identifying step identifies the transmission source of the received signal as either the suppression target transmission source or the non-suppression target transmission source in accordance with the first surrounding terminal list and the second surrounding terminal list.

2. The interference suppression method of claim 1, wherein the identifying step identifies the transmission source of the received signal as the non-suppression target transmission source when a transmission source identifier of the received signal is shown in both of the first surrounding terminal list and the second surrounding terminal list.

3. The interference suppression method of claim 1, wherein the identifying step identifies the transmission source as the suppression target transmission source when a transmission source identifier of the received signal is (i) shown in the first surrounding terminal list and (ii) not shown in the second surrounding terminal list.

4. The interference suppression method of claim 1, wherein the obtaining step obtains the second surrounding terminal list by receiving a signal that includes content of the second surrounding terminal list from the partner station, and reads out the content of the second surrounding terminal list from the signal received from the partner station.

5. The interference suppression method of claim 1, wherein the obtaining step includes sub-steps of:

transmitting, to the partner station, a request signal that requests the partner station to transmit the second surrounding terminal list to the reception station;

receiving a response signal that includes content of the second surrounding terminal list, the response signal being transmitted by the partner station in response to the request signal transmitted in the transmitting step; and reading out the content of the second surrounding terminal list from the received response signal.

6. The interference suppression method of claim 5, wherein the transmitting step performs the transmission of the request signal by transmitting, to the partner station, two Clear to Send (CTS) frames in succession.

7. An interference suppression device provided in a reception station to suppress an interfering signal that has been superimposed on a desired signal, the desired signal being transmitted by a partner station with which the reception station is performing communication, the interference suppression device comprising:

an identifying unit operable to identify a transmission source, from which the reception station received a signal, as either (i) a suppression target transmission source that has a possibility of transmitting the interfering signal superimposed on the desired signal, or (ii) a non-suppression target transmission source that does not have the possibility of transmitting the interfering signal superimposed on the desired signal;

an acquiring unit operable to acquire, from the received signal, a characteristic amount of the received signal;

a suppressing unit operable to, when the reception station receives the desired signal, suppress the interfering signal superimposed on the desired signal (i) with use of the characteristic amount of the received signal when the suppression target transmission source is identified as the transmission source of the received signal, and (ii) without use of the characteristic amount of the received signal when the non-suppression target transmission source is identified as the transmission source of the received signal;

a generating unit operable to generate a first surrounding terminal list showing a plurality of transmission source identifiers that indicate, in one-to-one correspondence, a plurality of transmission sources from which the reception station has received signals in the past; and an obtaining unit operable to obtain, from the partner station, a second surrounding terminal list showing a plurality of transmission source identifiers that indicate, in one-to-one correspondence, a plurality of transmission sources from which the partner station has received signals in the past, wherein the identifying unit identifies the transmission source of the received signal as either the suppression target transmission source or the non-suppression target transmission source in accordance with the first surrounding terminal list and the second surrounding terminal list.

* * * * *